(12) United States Patent
Wieder

(10) Patent No.: US 9,412,350 B1
(45) Date of Patent: Aug. 9, 2016

(54) CONFIGURING AN ORDERING OF COMPOSITIONS BY USING RECOGNITION-SEGMENTS

(71) Applicant: James W. Wieder, Ellicott City, MD (US)

(72) Inventor: James W. Wieder, Ellicott City, MD (US)

(*) Notice: Subject to any disclaimer, the term of this patent is extended or adjusted under 35 U.S.C. 154(b) by 0 days.

(21) Appl. No.: 14/838,167

(22) Filed: Aug. 27, 2015

Related U.S. Application Data

(63) Continuation of application No. 13/800,386, filed on Mar. 13, 2013, now Pat. No. 9,153,217, which is a continuation-in-part of application No. 13/286,578, filed on Nov. 1, 2011, now Pat. No. 8,716,584.

(60) Provisional application No. 61/408,690, filed on Nov. 1, 2010.

(51) Int. Cl.
  *G04B 13/00* (2006.01)
  *G10H 1/00* (2006.01)

(52) U.S. Cl.
  CPC .................... *G10H 1/0008* (2013.01)

(58) Field of Classification Search
  CPC .......... G10H 2240/131; G10H 2210/101; G10H 2240/141; G10H 2240/145; G10H 2240/125; G10H 2240/155; G10G 1/00; G10G 1/02
  See application file for complete search history.

(56) References Cited

U.S. PATENT DOCUMENTS

| | | | |
|---|---|---|---|
| 5,616,876 A * | 4/1997 | Cluts | G06F 17/30749 348/E7.071 |
| 5,732,216 A | 3/1998 | Logan | |
| 5,894,119 A | 4/1999 | Tognazzini | |
| 5,918,213 A | 6/1999 | Bernard | |
| 5,918,237 A | 6/1999 | Montalbano | |
| 5,973,250 A | 10/1999 | Zirille | |
| 6,044,047 A | 3/2000 | Kulas | |
| 6,188,010 B1 | 2/2001 | Iwamura | |

(Continued)

FOREIGN PATENT DOCUMENTS

| | | |
|---|---|---|
| WO | WO01/62065 | 8/2001 |
| WO | WO02/067447 | 8/2002 |
| WO | WO02/102079 | 12/2002 |

OTHER PUBLICATIONS

Bartsch, et al; "To Catch a Chorus: Using Chroma-Based Representations for Audio Thumbnailing"; Oct. 21-24, 2001.

(Continued)

*Primary Examiner* — Marlon Fletcher
(74) *Attorney, Agent, or Firm* — James W. Wieder

(57) ABSTRACT

A method, apparatus and system that enables a user to find and act-upon a sound-containing composition, in a group of compositions. One or more sound-segments, which are intended to prompt a user's memory, may be associated with each composition in a group of compositions. A recognition sound-segment may include a portion of its associated composition, which is more recognizable to users than the beginning part of its associated composition. A recognition-segment may contain one or more highly recognizable portion(s) of a composition. When the user is trying to locate or select a particular composition, the recognition-segments are navigated and played-back to the user, based upon a user-device context/mode. When a user recognizes the desired composition from its recognition-segment, the user may initiate a control action to playback; arrange; and/or act-upon, the composition that is associated with the currently playing recognition-segment.

24 Claims, 19 Drawing Sheets

(56) References Cited

U.S. PATENT DOCUMENTS

| | | |
|---|---|---|
| 6,219,837 B1 | 4/2001 | Yeo |
| 6,243,328 B1 | 6/2001 | Fenner |
| 6,247,130 B1 | 6/2001 | Fritsch |
| 6,437,227 B1 | 8/2002 | Theimer |
| 6,476,306 B2 | 11/2002 | Huopaniemi |
| 6,504,089 B1 | 1/2003 | Negishi |
| 6,504,990 B1 | 1/2003 | Abecassis |
| 6,555,738 B2 | 4/2003 | Hughes |
| 6,570,080 B1 | 5/2003 | Hasegawa |
| 6,600,898 B1 | 7/2003 | DeBonet |
| 6,643,621 B1 | 11/2003 | Dodrill |
| 6,670,537 B2 | 12/2003 | Hughes |
| 6,674,452 B1 | 1/2004 | Kraft |
| 6,697,796 B2 | 2/2004 | Kermani |
| 6,751,454 B2 | 6/2004 | Thornton |
| 6,834,308 B1 | 12/2004 | Ikezoye |
| 6,915,176 B2 | 7/2005 | Novelli |
| 6,933,432 B2 | 8/2005 | Shteyn |
| 6,941,275 B1 | 9/2005 | Swierczek |
| 6,941,324 B2 | 9/2005 | Plastina |
| 6,973,612 B1 | 12/2005 | Rodi |
| 6,998,527 B2 | 2/2006 | Agnihotri |
| 7,521,620 B2 | 4/2009 | Samadani et al. |
| 7,680,814 B2 | 3/2010 | Mercer |
| 7,743,092 B2 | 6/2010 | Wood |
| 7,754,959 B2 * | 7/2010 | Herberger .............. G10H 1/368 84/601 |
| 7,827,110 B1 | 11/2010 | Wieder |
| 7,884,274 B1 | 2/2011 | Wieder |
| 7,999,167 B2 | 8/2011 | Yoshikawa et al. |
| 8,001,612 B1 | 8/2011 | Wieder |
| 8,148,622 B2 * | 4/2012 | Rothkopf ............. G11B 27/105 84/604 |
| 8,370,952 B1 | 2/2013 | Wieder |
| 8,396,800 B1 | 3/2013 | Wieder |
| 8,487,176 B1 * | 7/2013 | Wieder ................ G10H 1/0025 84/615 |
| 8,716,584 B1 * | 5/2014 | Wieder ................ G10H 1/0033 84/609 |
| 2001/0037430 A1 | 11/2001 | Heo |
| 2001/0049086 A1 * | 12/2001 | Paquette ............. G10H 1/0008 434/307 A |
| 2002/0038597 A1 * | 4/2002 | Huopaniemi ..... G06F 17/30743 84/609 |
| 2003/0023421 A1 * | 1/2003 | Finn ................. G06F 17/30743 704/1 |
| 2003/0144918 A1 | 7/2003 | Novelli et al. |
| 2003/0158737 A1 | 8/2003 | Csicsatka |
| 2003/0159567 A1 * | 8/2003 | Subotnick ............... G06F 3/017 84/626 |
| 2004/0049540 A1 * | 3/2004 | Wood ................... G10H 1/0058 709/203 |
| 2004/0064209 A1 | 4/2004 | Zhang |
| 2004/0254883 A1 | 12/2004 | Kondrk |
| 2005/0004690 A1 | 1/2005 | Zhang et al. |
| 2005/0126369 A1 | 6/2005 | Kirkeby et al. |
| 2005/0241465 A1 * | 11/2005 | Goto ........................ G10D 1/00 84/616 |
| 2006/0235550 A1 | 10/2006 | Csicsatka |
| 2006/0236847 A1 * | 10/2006 | Withop ............. G06F 17/30058 84/612 |
| 2006/0254409 A1 * | 11/2006 | Withop ............. G06F 17/30029 84/601 |
| 2007/0017351 A1 * | 1/2007 | Aruffo ................... G09B 15/00 84/616 |
| 2007/0074618 A1 * | 4/2007 | Vergo ....................... G10H 1/00 84/612 |
| 2007/0074619 A1 * | 4/2007 | Vergo ....................... G10H 1/42 84/612 |
| 2008/0022846 A1 * | 1/2008 | Samadani ......... G06F 17/30743 84/610 |
| 2008/0075303 A1 * | 3/2008 | Kim ....................... G10H 1/125 381/103 |
| 2010/0211693 A1 * | 8/2010 | Master .............. G06F 17/30743 709/238 |
| 2012/0312145 A1 | 12/2012 | Kellett |
| 2014/0195026 A1 * | 7/2014 | Wieder ................. H04L 67/306 700/94 |
| 2014/0195919 A1 * | 7/2014 | Wieder ................. H04L 67/306 715/730 |
| 2014/0230630 A1 * | 8/2014 | Wieder ................ G10H 1/0008 84/609 |
| 2014/0230631 A1 * | 8/2014 | Wieder ................ G10H 1/0008 84/609 |
| 2015/0013527 A1 * | 1/2015 | Buskies ................... G10H 1/40 84/611 |

OTHER PUBLICATIONS

Serafine, et al; "On the Nature of Melody-Text Integration in Memory for Songs"; Journal of Memory and Language 25; 123-135 (1986).

Marian, et al; "Language-Dependent Recall of Autobiographical Memories", Journal of Experimental Psychology: General; 2000, vol. 129, No. 3, 361-368.

* cited by examiner

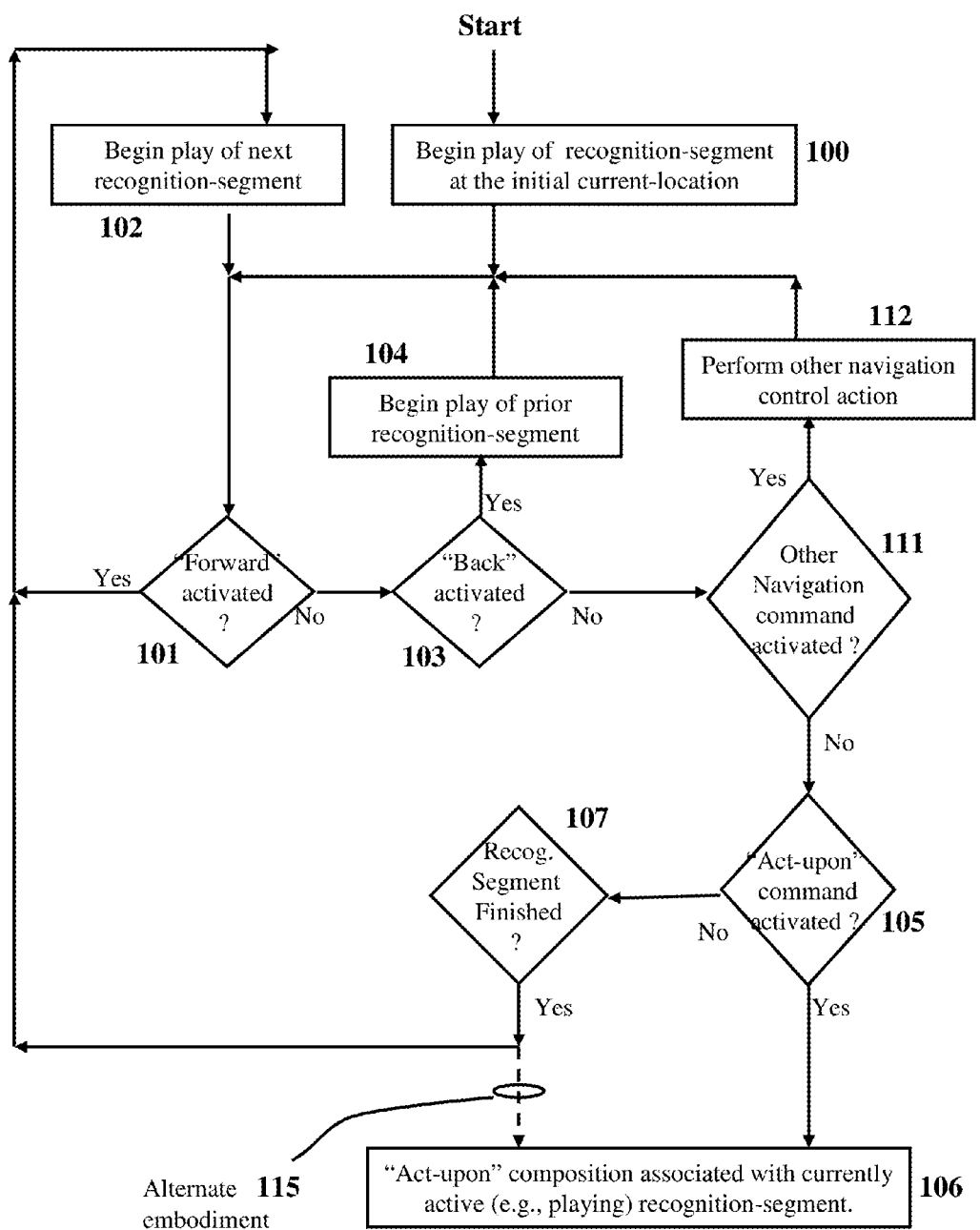

Fig. 3

| Order | Composition | Recogition Segment |
|---|---|---|
| ... | ......... | ......... |
| j-1 | 108,293 | RA108,293 |
| j | 427,177 | RA427,177 |
| j+1 | 923,976 | RA923,976 |
| j+2 | 22,108 | RA22,108 |
| .... | ...... | ........ |
| | | |

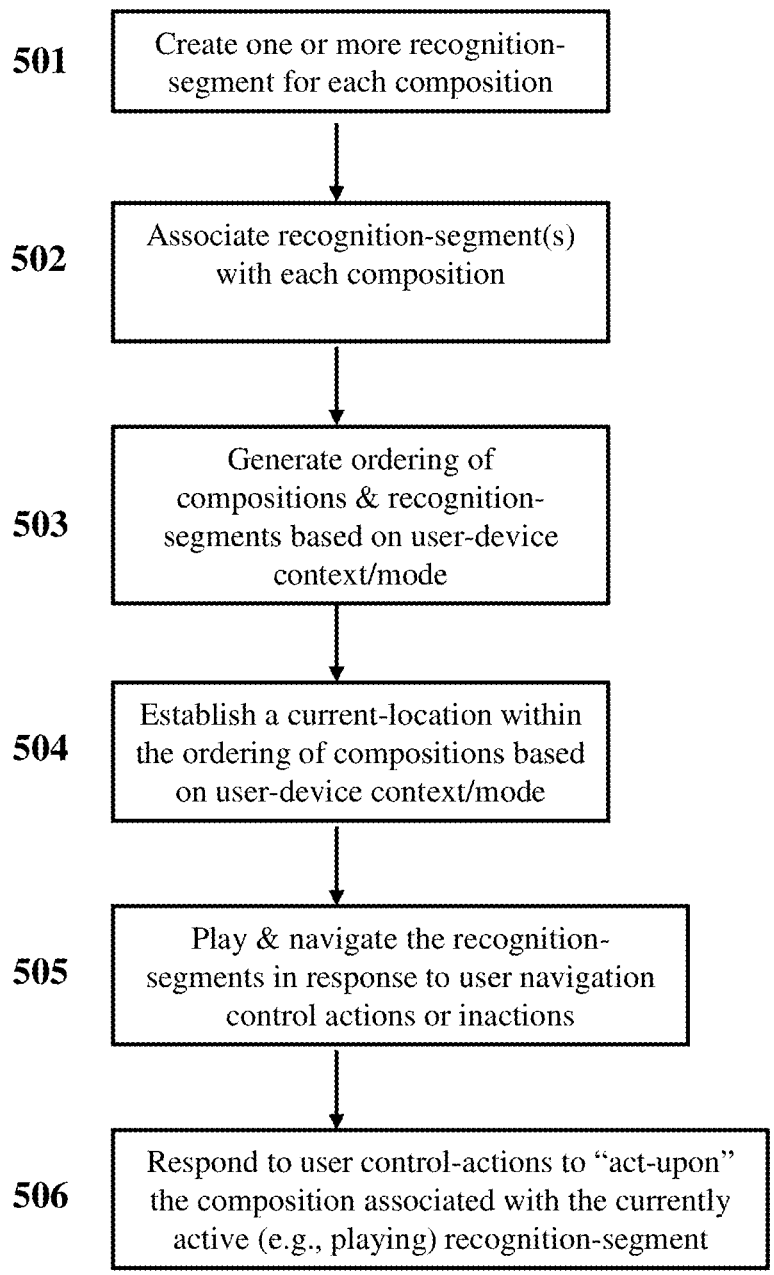

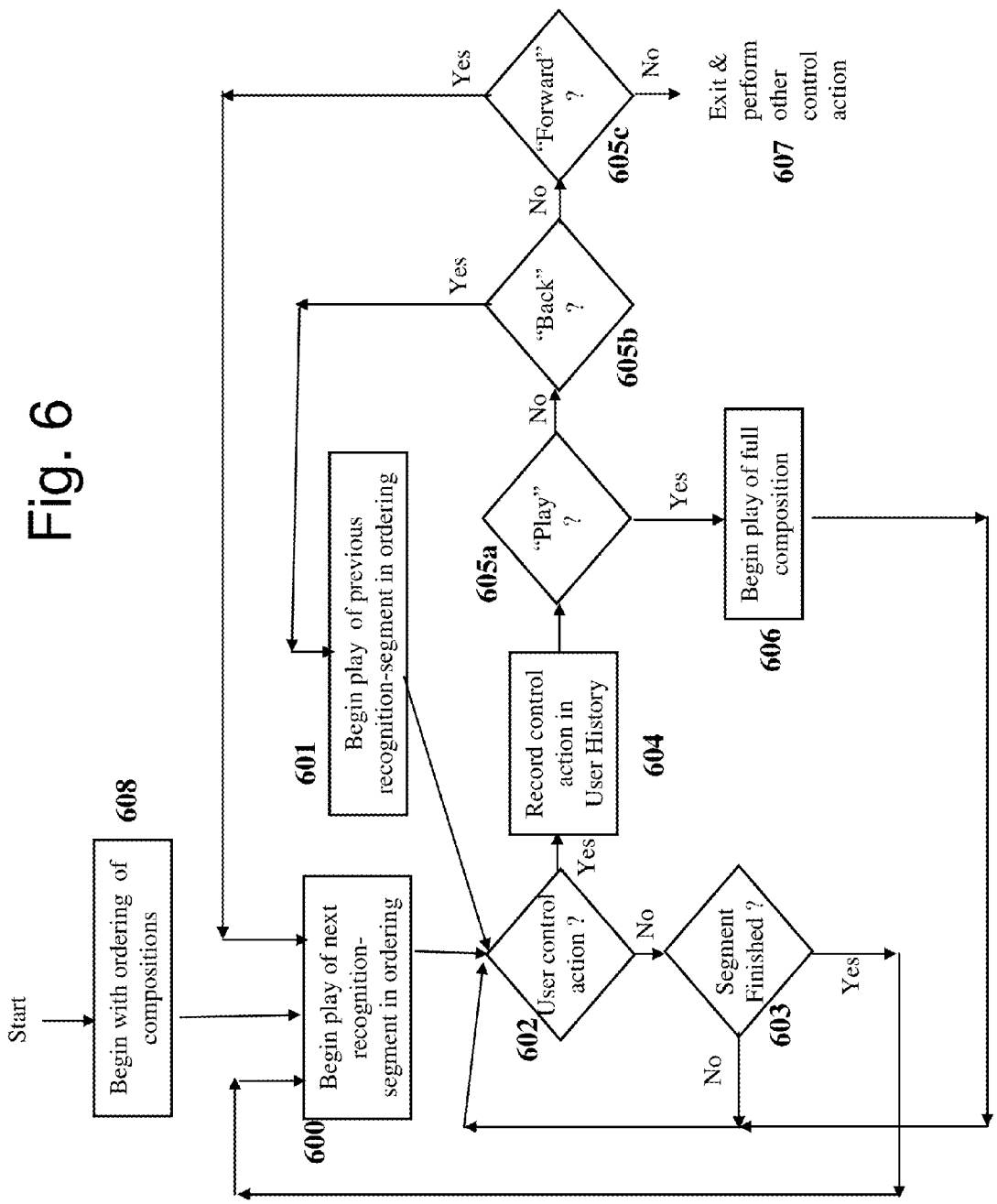

Legend:
B = Beginning Sound-Segment.
R = Recognition Sound-Segment(s).
E = Ending Sound-Segment.

US 9,412,350 B1

CONFIGURING AN ORDERING OF COMPOSITIONS BY USING RECOGNITION-SEGMENTS

RELATED APPLICATIONS

This application is a continuation of U.S. application Ser. No. 13/800,386 filed Mar. 13, 2013, now U.S. Pat. No. 9,153,217; which is a continuation-in-part of U.S. application Ser. No. 13/286,578 filed Nov. 1, 2011, now U.S. Pat. No. 8,716,584; which claims the benefit of Provisional Application 61/408,690, filed Nov. 1, 2010, entitled "Using Recognition-Segments to Find and Act-Upon Compositions Containing Sound". These earlier applications, in their entirety, are incorporated by reference into this specification.

BACKGROUND

Description of Related Art

If the user wants to find or playback a particular song on a compact disk (CD), personal computer hard drive or music-device (such as an Apple iTunes or iPod), the user typically needs to know the song title by name, then locate the song (or song number) in a written song listing and then activate user controls to reach the start of the desired song. This requires the user to know the song title and for the user to visually read information on the media packaging (e.g., CD liner) or user-device display-screen.

Alternatively, the user can navigate between songs using the "forward" and "backward" controls and hear whether the desired song is playing. But this can be frustrating because the beginning of a composition often begins "slowly" and/or with a slowly increasing volume and are often less distinguishable. A listener may have to listen to the beginning of a composition for a significant time before determining that the composition is actually the one they were "looking" for.

Some user-devices (e.g., Apple iTunes and iPod) allow a user to create a customized ordered playlist by manually selecting compositions from a library of compositions. The user is typically presented with a visual listing of the available library and a visual listing of the playlist selections by composition title/artist, in-order to add or remove compositions from the playlist by interacting with the display. The user is required to make their playlist selections by knowing the composition by title and artist. If they are uncertain what the composition is by its textual information, they may have an option to play the composition from its beginning. But this is frustrating since the listener may have to listen to the beginning of a composition for a significant time before determining that the composition is actually the one they were "looking for".

SUMMARY

A method, apparatus and/or system to enable a user to more quickly find and act-upon a composition, that contains an audio component, in a group of compositions.

A short, but highly recognizable portion(s) (a recognition-segment) of each composition may be associated with each composition in a group of compositions. A recognition-segment may include a portion of its associated composition, which is more recognizable to users than the beginning part of its associated composition.

When the user is trying to locate and/or act-upon (e.g., play or arrange/organize) a particular composition, the recognition-segments may be played back to the user based on a user-device context. When a user recognizes the desired composition from its recognition-segment, the user may initiate a control action (or inaction) to act-upon (e.g., playback) the composition that is associated with the currently playing recognition-segment.

Although the disclosed concepts and embodiments may be particularly useful with musical compositions, they may useful with any type of media or multi-media composition that contains an audio component.

There are many objects and advantages of the disclosed embodiments, when compared with the existing state of the art. The objects and advantages may vary with each embodiment. The objects and advantages of each of the various embodiments may include different subsets of the following objects and advantages:

1) Allow a user to quickly find a desired composition for playback without knowing the name of the composition (e.g., song) or artist/creator.
2) Prompt a user's memory with a distinguishable portion of a composition.
3) May be used in combination with a visual display to find or select a desired composition.
4) Compatibility with existing audio devices and modes of operation.
5) Easy for the user to adapt and use.
6) Usable with very large number of compositions now available with increased storage capacity user-devices.
7) In some embodiments, reduce/eliminate the user's need to look at a textual listing or a visual display to locate a desired composition.

BRIEF DESCRIPTION OF DRAWINGS

FIG. 1 is a flow diagram illustrating the navigation of recognition-segments and the acting-upon the composition associated with a currently "active" recognition-segment.

FIG. 3 illustrates one embodiment of an association of a recognition-segment with each composition and an ordering of compositions.

FIG. 5 shows a high level flow diagram for one embodiment.

FIG. 6 is a flow diagram of one embodiment of a composition-finder.

DETAIL DESCRIPTION

Although some of the following detailed embodiments are illustrated or described in terms of audio or musical compositions, the disclosed concepts and embodiments may be more generally applied to any type of composition, digital-work or digital-content including recorded-music; music videos; multi-media; artwork; pictures; audio; sound; short films; movies; video clips; television programs; audio versions of books; talks; speeches; voice content; lectures; software; software plug-ins; and any other type of digital-work.

In general, where the word "composition" is used in the description, "digital-work" or "digital-content" may be substituted in its place. Where the words "playback-device" or "player" or "media-player" is used in the description, "user-device" may be substituted in its place. Where the word "composition-provider" is used in the description, "digital-work-provider" or "digital-content-provider" may be substituted in its place.

Problems with Prior Art Methods/Systems:

In prior art methods/systems, when the user is trying to locate a composition by hearing it (e.g., trying to find a composition on a disk), the beginning of each composition is played back to the user. In general, the beginning of a composition is often significantly less memorable and distinguishable and is typically much less quickly recognized by a listener, compared with other parts of a composition. Consequently, it may take a listener many times longer to recognize the start of the composition compared with another more recognizable section of the composition.

Figure 12:
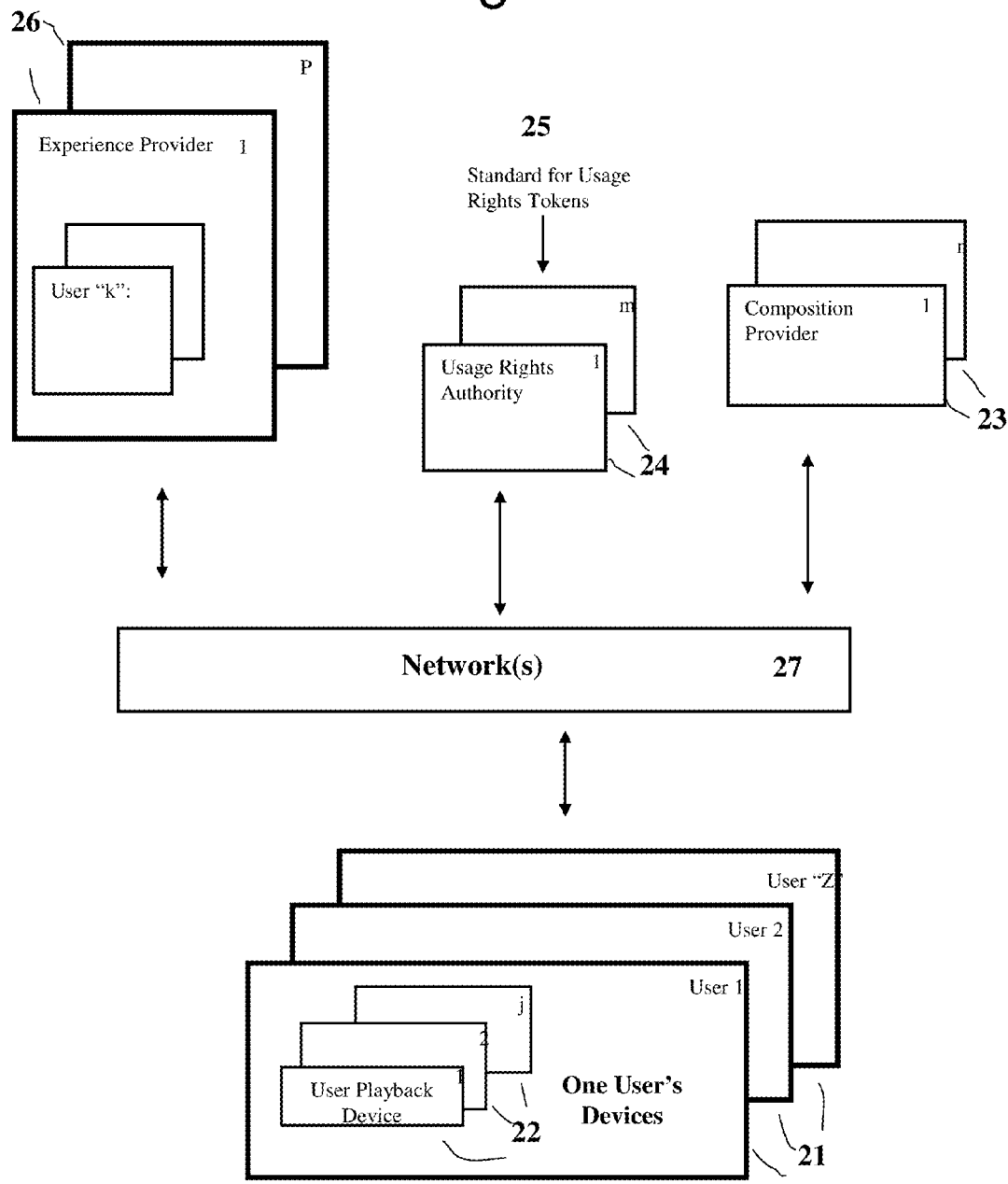
FIG. 12 shows an embodiment of the functional flow between user-devices, experience providers and composition providers.

Distribution System:

FIG. 12 illustrates the functional flow between user-devices 22, composition providers 23, experience providers 26 and usage rights authorities 24 across one or more networks 27.

As shown in FIG. 12, there may be a plurality of possible users 21 (user1, user2, . . . , user"z"). Each user may operate one or more user playback devices 22 at different times and different locations. The devices a given user operates may be at many different locations, such as at home(s), work(s), automobile(s), portable(s), etc. User-devices may also be incorporated into other products such as a cell phone, television or home entertainment system. The user-devices may be mobile and portable. Some devices (i.e., a personal player) may be used by only a single individual user. Other devices (i.e., an automobile player) may be operated by different individuals at different times. The user-devices may be manufactured by a many different vendors. Any given user-device may only be able to handle a limited number of the available composition formats.

There may be many composition providers 23 that each provide their own catalog of compositions for which they control the intellectual property rights. A composition provider may control the compositions for a single composition creation entity [i.e., the creative artist(s) or group] or many composition creation entities.

There may also be many different experience providers 26. An experience provider is responsible for providing the adoptive personalized entertainment sequence that is customized for each user and is integrated with the user's collection of compositions. The experience provider may automatically introduce the user to appropriate new compositions over time and automatically adopt the personalized program sequence as a user's tastes change. The experience provider automatically distributes the user's collection and also automatically collects and maintains the user's profile and history across all the user's devices. The user's collection is made available to any device the specific user is operating.

There may also be one or more usage rights authority 24. The usage right authority or authorities utilize a common "standard for usage rights tokens" 25 so that a user's collection of compositions, represented by the set of usage rights tokens a user acquires, may be recognized and usable with all experience providers. Each usage rights token is for use by only a specific individual user. The compositions in a user's collection may be easily transferred between and used with any of the experience providers. The listening rights authority may also maintain a database of all issued tokens so a user's collection (usage rights tokens) may be preserved even if all the devices of a user were to be lost or damaged.

Portions of the network(s) 27 may be wired or wireless. A wireless interface between user-devices and the network may be preferred since the wireless connection may be established and maintained more automatically and with minimal user efforts.

Most users will typically utilize many different players at different locations throughout the day and from day-to-day such as in different rooms of the home, at different homes, at different work locations, in different automobiles, or various portable devices. In addition, there may be many devices that the user may only temporarily use, such as devices located at a hotel, a rental home, a rental car, on loan from a friend, etc. It is desired that the user's history and profile be interoperable and automatically synchronized between all these devices so the user history collected at each device is available to all other user-devices. An experience provider may automatically perform the required level of synchronization between all of the user's devices and storage locations on the network(s).

In one embodiment, the user history and user profile information is stored redundantly at multiple locations distributed across a network(s), such as the internet, so that the user's information has a high availability (even if some network nodes/paths are down) and is robustly protected from loss. Periodic back-up or archiving of the information may also be utilized to provide an additional protection against loss of the user's information. In one embodiment, this storage function is provided by the experience provider. Alternatively, a separate storage provider may provide storage, backup, archiving and protection of the user's history and library on the network. In-order to protect user privacy, user information stored on the network may be stored in an encrypted form for which the storage provider does not hold the decryption keys. Encryption mechanisms may be utilized to keep a user's history private and not accessible to human prying.

Experience Providers:

An experience provider is responsible for providing the adoptive personalized music (or entertainment) program that is customized for each user and is integrated with the user's collection of compositions. The experience provider may coordinate, any subset or all of, the following functions automatically without requiring any significant user action:

1) Provide a sequence of compositions, highlights and other material that is customized for each user based upon the prior history of user control actions and feedback.
2) Provide copies of compositions, highlights and other material to all user-devices as needed.
3) Manage, store, backup and make available the user's collection so that it is available to all the user's devices. The user's collection may be represented by a set of user usage rights tokens.
4) Manage, store, backup and update the user's history (including control actions, feedback, play history, profile) across all the user's devices in-order to adapt to the user's changing tastes.
5) Recommend new compositions and highlights likely to be appealing to each specific user. Automatically incorporate the new compositions and highlights into the user's program sequence and the user's collection.
6) Provide pre-customized channels for each user (representing different categories, genre or moods of music) that may then be further optimized for each user based on user control actions and feedback.
7) Provide additional advertisements, news, or weather presentations in the user's program stream that may be customized for each user based on user control actions, feedback or user profile.
8) Provide software updates for user-devices.
9) Obtain usage rights for compositions that are made available to the user. Pay royalties to composition owners based on the user's usage.
10) Bill users for composition purchases, usage and other services.
11) Provide a "capture" mode capability to enable user's to identify and later experience and evaluate a composition they may be hearing from a non-user-device.
12) Provide a "share" mode capability to enable a user to share a list of compositions with other users.

Although all of the above functions may be performed by the user's experience provider, the may performed by separate entities that may be under the coordination of the user's experience provider. It is desirable that the user have many experience providers to chose between and to be able to easily switch (with low switching costs) from one experience provider to another.

It may be desirable that the user's collection be easily transferable between experience providers. This may be accomplished with user usage-rights tokens that are issued by one or more listening right authorities that may be universally recognized by all experience providers. This eliminates problems with tokens issued by each experience provider but which may be not recognized by other experience providers and hence may be not transferable.

The experience provider's costs for the library storage and management functions may be effectively amortized across a large number of users. All transfers of information between the experience providers repository (or depository) and the user-devices may occur automatically without requiring any user knowledge or action. Concurrency of user data in the currently active user-device(s) and the repository occurs automatically across the network without the user needing to be aware of it or taking any action.

Prior to a device shutting down, all the latest user feedback and user history may be forwarded to the network repository for later use by other user-devices. The device's user display may optionally include an indicator, that is activated during device shutdown, to indicate whether concurrency with the repository has been completed. Optionally, the device may include a automatic capability of periodically trying to establish a network connection for upload in-order to complete concurrency with the repository prior to concluding shutdown.

It is desirable that user-devices be able to operate with intermittent or temporarily unavailable network connections. When a network connection is not available, the user-device may utilize compositions and highlights that were previously transferred to the local storage in the device. New highlights and new compositions may be limited to what was locally stored during previous network connections. In addition, timely information such as news and weather may not be available when the network connection is lost.

News, weather, traffic, etc may also be customized for the user based upon factors such as the day of week, time of day, or the location of user. Customization of weather and traffic reports to the day of week and time of day. Reports may be automatically adapted to the current physical location of the user.

Since the entertainment program may be customized for each user, typically only one user program needs to be active at any one time. In some cases, the user may want the same program to be available at multiple locations, such as in multiple rooms in a house. The experience provider may impose limitations on the number of simultaneously active user-devices and/or the maximum physical separation of devices that may be simultaneously active. The experience provider may monitor for violations which may indicate piracy or identity theft by examining the user history.

Figure 13:
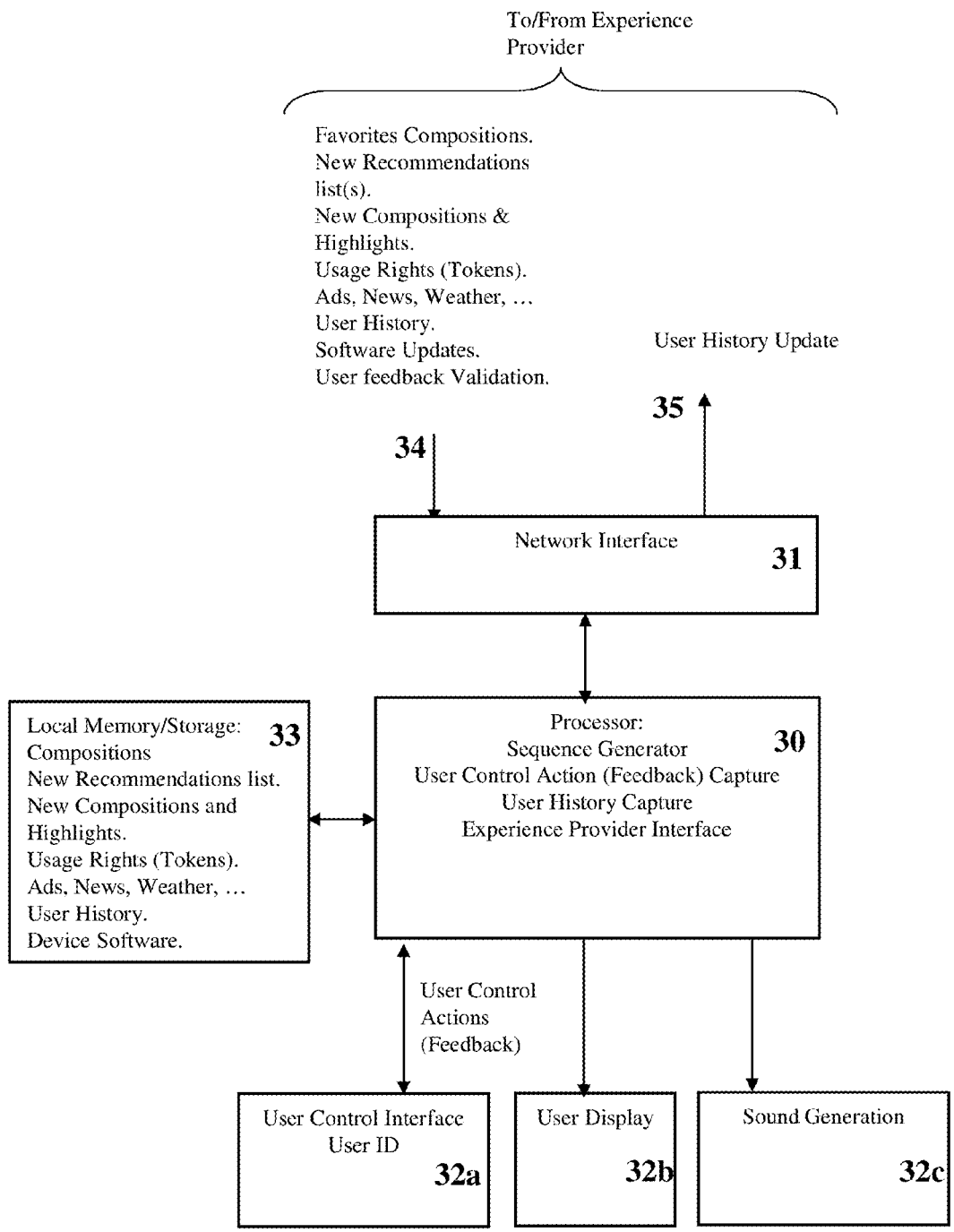
FIG. 13 shows an embodiment of a functional block diagram of a personalized music player.

User-Device:

FIG. 13 is a functional diagram of a user-device for generating an adaptable personalized entertainment experience. The user-device includes a "user control interface" 32a for accepting user control actions and for determining the individual user (and user ID). The user-device may include a "user display" 32b for presenting visual information for the current composition or device status. The user-device also includes "sound generation" capabilities 32c or an interface to an external sound generation apparatus so the user may hear the customized sequence of compositions and other program information. The user-device includes storage/memory 33 to hold information locally that may include: 1) Compositions. 2) New recommendations list(s). 3) New compositions and highlights. 4) Usage rights (tokens). 5) Advertisements, news and/or weather. 6) User history 7) Device software and updates.

The "network interface" 31 receives information 34 from the experience provider and sends information 35 to the experience provider. Most transfers to and from the experience provider occur automatically without requiring the user to specifically initiate them. Information received 34 may include: 1) Favorite compositions. 2) New recommendations list(s). 3) New compositions and highlights. 4) Usage-rights tokens. 5) Ads, news and weather. 6) User history. 7) Software updates. 8) User feedback validation. Information sent 35 to the experience provider may include the user's history and updates to the user's history. User history and updates to user history may include: 1) User profile information. 2) User control actions. 3) User feedback. 4) User playback history. 5) User content restrictions.

The user-device also includes a processor 30. The processor performs the user functions such as 1) Sequence Generation. 2) User control action (feedback) capture. 3) User history capture and update. 4) Experience provider interface transfers.

User Interface:

The personalized player may be controlled by the user via numerous types of user interfaces including voice activated, manual controls, touch screens, interactive displays, remote control devices, etc.

Figure 4A:
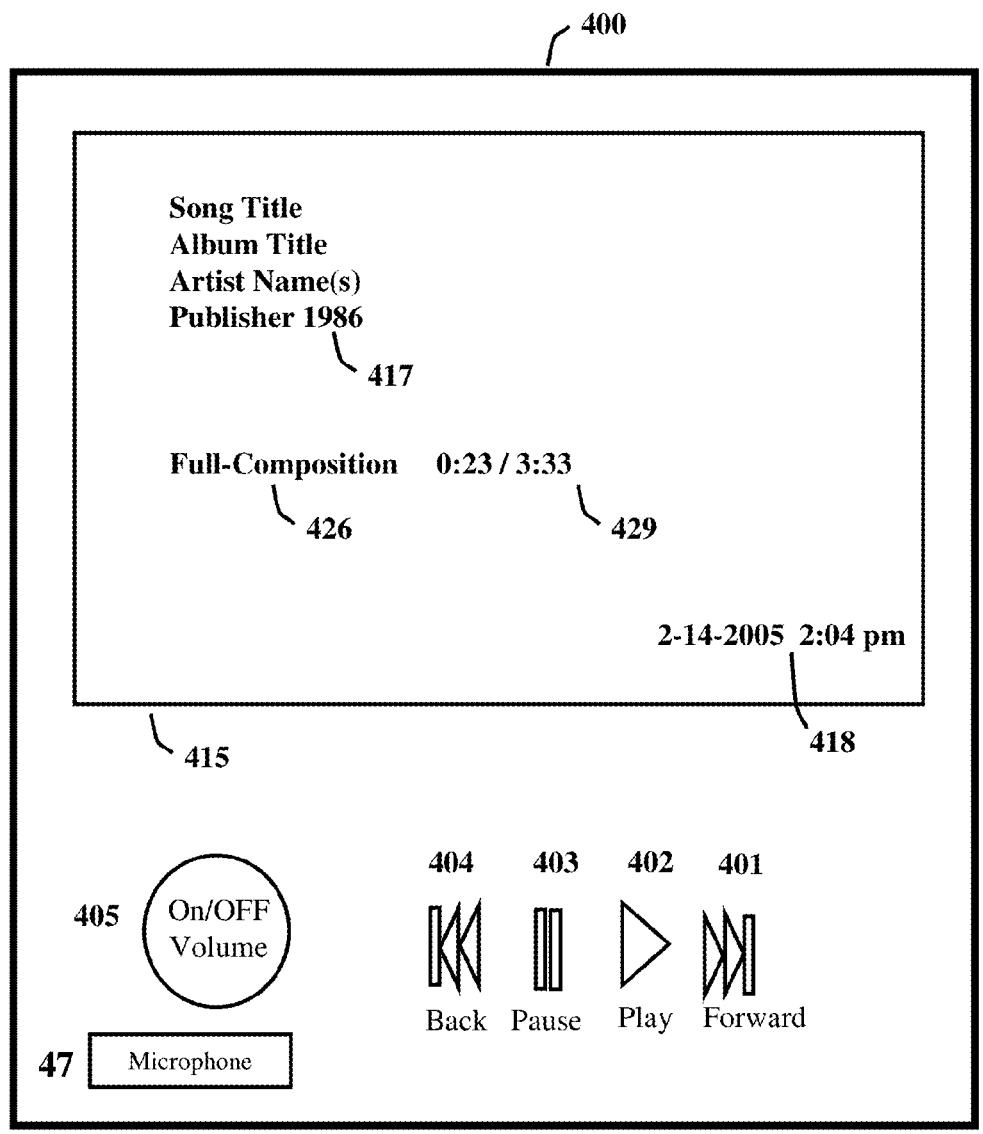
FIG. 4a illustrates one embodiment of user-device controls (full composition playing).
Figure 4B:
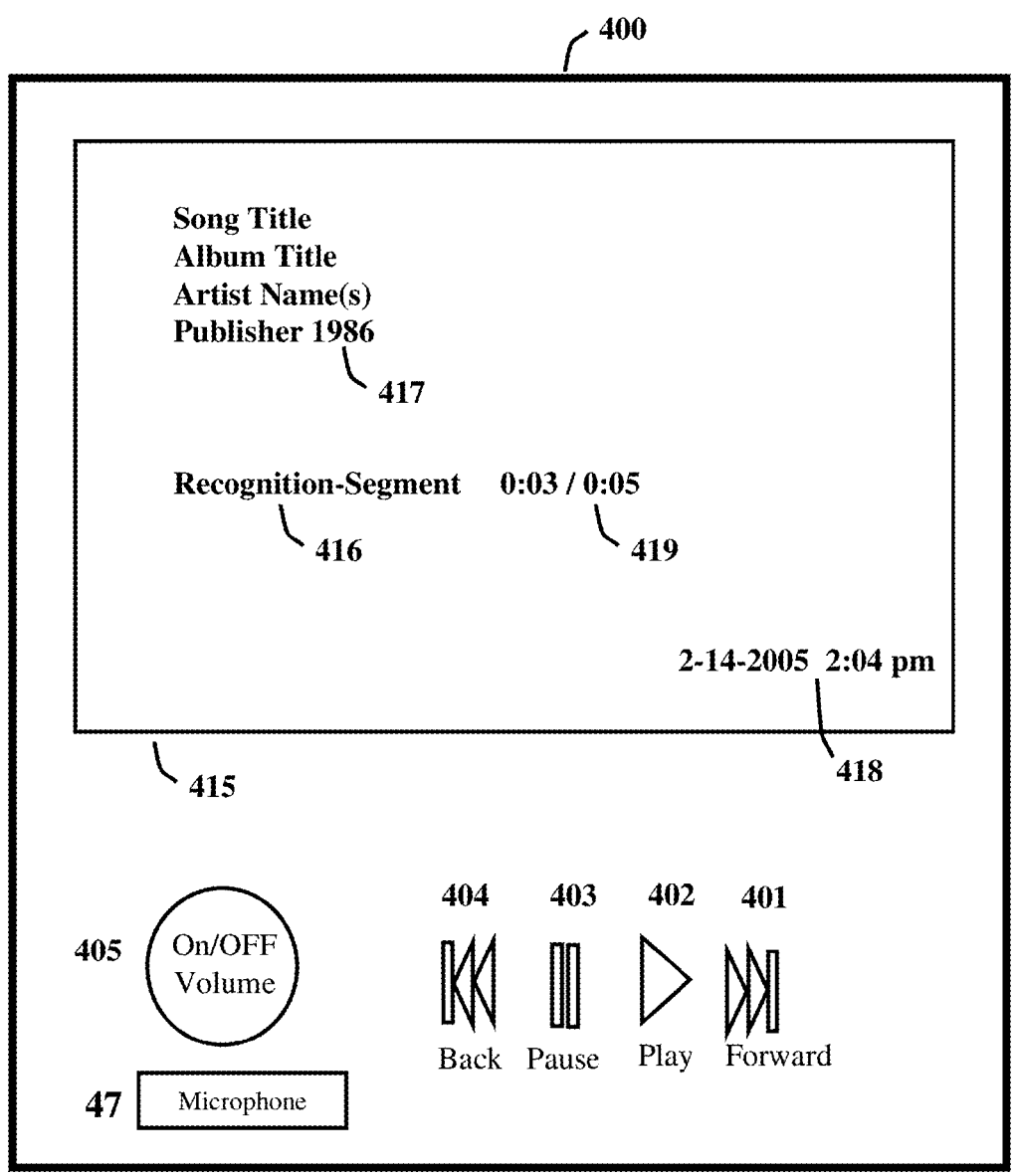
FIG. 4b illustrates one embodiment of user-device controls (recognition-segment playing).

FIGS. 4a and 4b show an example of a manual user interface for use where the user is within reach of the controls such as with a portable player, a remote control, or a player located in an automobile within reach of the driver. Such controls may be implemented with electrical-mechanical controls such as push buttons, switches, sliders and knobs or with interactive touch screen control. In another embodiment, the controls of FIGS. 4a and 4b may also be accomplished with voice commands.

The "Favorites-New" slider 41 is used to vary the percentage of new compositions that the user will hear. When the slider is at the "favorites" position (lowermost position) all compositions may be selected among those most highly liked by the user. When the slider is positioned at the "new" position (uppermost position) the user is only exposed to new compositions he or she is not familiar with. The user may adjust the "Favorites-New" slider position by activating (pressing) the "New" 42a and "Favorites" 42b controls or in an alternative embodiment by dragging the slider indicator 41 upward or downward. As the slider 41 is positioned further away from "favorites" and closer to "new", the user will hear a greater percentage of new compositions and a lower percentage of favorites.

In another variation, highlight-snippets may be inserted at increasing frequency as the position of the "Favorites-New" slider is closer to the "new" position.

As shown in FIGS. 4a and 4b, the device may include a display 40 to indicate information about the selected channel, composition being played (artist, title, etc), playtime, device status, etc.

As shown in FIGS. 4a and 4b, the user-device may include typical user controls such as "pause" 42e, "play" 42d, "forward" (or "skip") 42c, "back" 42f, and channel controls (43a, 43b, 43c and 43d).

Depending on the embodiment, the user-device may also include various other navigation controls to navigate an ordering of compositions or recognition-segments in one or more dimensions (1-dimensions; 2-dimensions; 3-dimensions; etc) such as forward; back; up; down; left; right; in; out; etc. as described elsewhere in this specification.

In another optional enhancement, when a sequence of user commands indicate user difficulty or frustration, the device may issue recommendations to the user on how to better utilize the device's capabilities. Such recommendations might be issued by voice synthesis or on the device display.

Identifying the Specific User:

Each user-device may determine the specific user that the entertainment program will be customized for. In one embodiment, each time the device is re-started or powered-up the user may be re-determined so that multiple users may intermittently share the same device, yet experience a customized program. Voice recognition of the user's voice or a unique verbal identifier or some combination of both may be used. Other possibilities include the recognition of the user via a camera image taken at startup, or various bio-metric sensing of the user such as fingerprint sensor on the "on" control or other device controls. The input microphone 47 (or other sound sensor) may be used for both voice recognition and shared with other optional audio input modes and/or other device functions that utilize a microphone.

The device may also keep a list of prior user's so the identification process may be defaulted or biased toward the most recent user(s). For devices that may be typically used by only a single user, the user identity may be configured on initial use and not reconfigured unless a reconfiguration is specifically requested by the user. It is preferred that the user identification process require minimal or no specific user actions.

Accuracy in identification of the user is important to prevent corruption of both the user's usage-rights and user history due to user identity errors, piracy or identity theft. Additionally, since the user's history and usage-rights may be of considerable value to each user, user "identity theft" may be protected against. Methods for identity recovery may be employed, so a user's history may be restored to the state just prior to the occurrence of an identity theft. Software may be utilized by the experience providers to monitor for unusual behaviors that may be indicative of identity theft.

It is desirable to create a user experience so that it is in the user's interest to correctly identify themselves to the "system" and to protect themselves against identity theft or the loaning of their identity to others. User's will realize that the use of their identity by others, will corrupt their user feedback history and compromise their customized program experience. By providing a customized experience and continually providing new compositions that may be of high value to the user, users will be naturally compelled to correctly identify themselves and avoid loaning their identity to others.

Besides the everyday user ID, a more hidden and secured user identity may be maintained by the "system". This allows the user to re-establish a new everyday ID if their everyday user ID becomes compromised.

Network Strategies:

It is expected that each user will have multiple user-devices that need to be updated such that any changes to the user's history and user's collection (i.e., the user's library of compositions) is automatically made available, in a timely manner, to all the other user-devices where the user is active. For example, any changes made in the automobile on the way home may be immediately available, in the ideal, to user-devices in the user's home.

In one embodiment, each user-device 22 would be capable of establishing two way communication in-order to interact with the experience-provider 26 over a wireless or wired connection to a network such as the internet.

When the user-device 22 has sufficient storage, the user's favorites may be stored locally and the general network strategy is to download the most likely needed compositions and highlights well in advance of actual need by the user-device. Having storage in each user-device 22 is more accommodating to poor quality, intermittent, or missing network connections.

When a local user-device 22 has sufficient local storage, the network interface may be managed to minimize communication costs. For example, the largest downloads and uploads may be scheduled during those times (of the day or night or week) when the communication costs may be lower. For example, downloads of new compositions and highlights may occur, automatically without user action, in the middle of the night and then stored within each user-device 22 for possible use during the following days. More information may be downloaded than is typically expected to be needed, just so it will be available if needed. Since the typical user's tastes change slowly over a period of days, the locally stored compositions and highlights will be fairly up-to-date; but an automatically generated sequence of compositions may be less then ideal when switching between user-devices (e.g., car to house), since the most recent user history would not be exchanged until later that night. If desired, the less data intensive user history/feedback may be communicated more frequently, while the more data intensive downloads may be restricted to lower cost communication times.

Another alternative is to broadcast and/or multicast the data intensive information (compositions and highlights) to multiple users simultaneously over the network. Prior to the broadcast or multicast, each user-device 22 receives an update on what new compositions and highlights that user needs. The user-devices then monitor the broadcast or multicast, and save the appropriate data the user is expected to need.

User-devices may also network directly with each other and/or over a network to pass update information.

In one embodiment, where networked access is not available in remote locations, the update to the remote user-devices may be handled by a portable user-device carried from a networked area into the remote area. The portable user-device then networks with the remote user-devices to update them. Similarly, after leaving the remote area and re-establishing a network connection. The portable user-device may update the repository with the user feedback that occurred in the remote area. In this case, the user-devices may directly interact to share information when they are within communication range with each other. Such direct communication may be accomplished by IR or RF means such as WiFi or Bluetooth.

Some embodiments may (optionally) employ/utilize streaming over a network connection such as the internet. With streaming, the personalized sequence is generated at the experience-provider's location on the network 27 (e.g., internet server) and forwarded, wired and/or wirelessly, to the user-device as a stream of packets. The user-device may be simplified since it only need convert the packets into the entertainment sequence (e.g., sound sequence) and send the user's feedback back across the network 27 to the experience-provider. Streaming may reduce the needed amount of local storage and local processing in the user-device. In some embodiments, a small local memory (such as a FIFO or double buffer) is used in the local user-device to provide a continuous sound stream on the output side, despite fluctuations in the receipt and processing of packets across the network connection. A possible disadvantage of streaming is that a virtually continuous interactive network connection at an effective bandwidth may need to be available. Another possible major disadvantage is that the network connection may need to have an acceptably low interactive latency so the experience-provider's streaming source may quickly adjust to the user's feedback and control inputs (such as the "Forward" and "Back" controls). The need for a higher quality network connection to be continuously available may make streaming a less desirable alternative for some embodiments.

Hardware and Software Embodiments:

FIG. 13 shows one embodiment of a user-device. In some embodiments, the user-device may be made portable; mobile; and/or wearable.

The basic elements are the digital processor 30 and local storage memory 33. The digital processor 30 incorporates and executes the processing program to process the composition data to generate a unique sequence of sound samples. The memory 33 may hold composition data; software (program) code; and working storage.

The digital processor 30 may be implemented with any digital processing hardware such as Digital processors, Central Processing Units (CPU), Digital Signal Processors (DSP), state machines, controllers, micro-controllers, Integrated Circuits (IC's), Custom Integrated Circuits, Application Specific Integrated Circuits (ASIC's), Programmable Logic Devices (PLD's), Complex Programmable Logic Devices (CPLD's), Field Programmable Gate Arrays (FPGA's), Electronic Re-Programmable Gate-Arrays/Circuitry and any other type of digital logic circuitry/memory.

If the processor is comprised of programmable-circuitry [e.g., electronically re-configurable gate-array/circuitry], the processing program (or portions of the processing program) may be incorporated into the downloadable digital logic configuration of the gate array(s).

In some embodiments, the digital processor may comprise a plurality of processors in a multi-processing arrangement which may execute the sequences of instructions contained in memory 33.

The memory 33 may be implemented using random access memory (e.g., DRAM, SRAM), registers, register files, flip-flops, integrated circuit storage elements, and storage media such as disc, or even some combination of these. The memory 33 may include a non-volatile memory to store boot-up data and other data locally. The memory 33 may optionally include a hard drive or other mass storage device. Software code; processing programs; firmware; hardware configuration data; composition data and other data may be stored in the memory 33.

The user-device may optionally include a media drive to allow both composition data and processing programs to be read from media.

The user-device may optionally include a network interface 31 to allow access to the Internet, other networks or mobile type networks. This would allow composition data and the corresponding processing programs to be downloaded across the Internet or other network(s).

Embodiments may include any combination of hardware circuitry and software/firmware. In some embodiments, hardwired circuitry and/or programmable-circuitry may be used in place of or in combination with software instructions.

The processor software, machine-language executable instructions, machine-interpretable instructions, firmware, and/or the configuration-data base of electronically-configurable-circuitry: may be stored on/in one or more computer-readable medium/media, and/or one or more digital storage memories.

Depending on the embodiment, the computer-readable medium may include: nonvolatile media, volatile media, and transmission media. Nonvolatile media include, for example, optical or magnetic disks, such as media drive 105. Volatile media include dynamic memory (e.g., DRAM). Transmission media include coaxial cables, copper wire, and fiber optics, including the wires that comprise an interface/communications bus. Transmission media can also take the form of acoustic or light waves, such as those generated during radio frequency (RF) and infrared (IR) data communications.

In some embodiments, the computer-readable media may include: floppy disk, a flexible disk, hard disk, magnetic tape, any other type of magnetic medium; Compact Disk (CD), CD-ROM, CD-RAM, CD-R, CD-RW, DVD, DVD+-R, DVD+-RW, DVD-RAM, and any other type of optical medium; punch cards, paper tape, any other physical medium with patterns of holes; RAM, DRAM, SRAM, PROM, EPROM, EEPROM, Flash-memory, FLASH EPROM, and any other type of memory chip/cartridge; or any other type of storage or memory from which a processor/computer can obtain its digital contents.

Example of a Composition Finder Using Recognition-Snippets:

Another optional enhancement is the composition finder tool to aid the user in finding a particular composition in a group of compositions by audio sound. Associated with each composition is a short recognition-snippet (sound segment) which has been pre-selected as the most quickly recognized portion of the composition. The recognition-snippet may be a separate sound segment (file) that is a few seconds long, representing a highly distinguishable part of the composition. Alternatively, the recognition-snippet may be defined by start and end pointers into the full composition itself. The choice of the highly recognizable portion(s) of each composition may be made by the artists, experts, focus groups, or others. The recognition-snippet is expected to be different and shorter than the highlight-snippet.

The composition finder is useful whenever the user wants to locate a specific composition in a group of compositions. Examples of groups of compositions where the composition finder may be used include:

1) A set of user favorites ordered from most favorite to least favorite.
2) A set of recent plays ordered from most recent to least recent.
3) A set of compositions by an artist (such as an album or collective works). The set may be ordered by highest to lowest estimated user likeability or another order, appropriate to the user's request.
4) A set of compositions in a particular genre. The set may be ordered by highest to lowest estimated user likeability or another appropriate order.
5) A set of compositions resulting from a user initiated search. The search results may be ordered from highest to lowest probability of matching the user's request. The search request my have been initiated by any means, including a user's verbal (voice) request for a specific composition, where there may be multiple compositions that match the request.

FIG. 5 shows a high level flow diagram for one embodiment. The first step is to "create one or more recognition-segment for each composition" 501. The next step is to "associate the recognition-segment or segments with each composition" 502. The next step is to "generate an ordering of compositions and their associated recognition-segments based on user-device context/mode" 503. The next step is to "establish a current-location within the ordering of compositions based on user-device context/mode" 504. The next step is to "play and navigate the recognition-segments in response to user navigation control-actions or inactions" 505. The next step is to "respond to user control-actions to "act-upon" the composition associated with the currently active (e.g., playing) recognition-segment" 506. Depending on the embodiment, the currently active recognition-segment may be the currently playing recognition-segment and/or the most recently played recognition-segment.

In some embodiments, only a subset of these steps may be performed and/or these steps may be performed in a different order. In some embodiments, these steps may be performed along with other steps or optional steps.

Each of these steps, along with alternative approaches and optional enhancements are detailed in the sections that follow.

Creation and Definition of a Recognition-Segment:

FIGS. 2a-2e show several of the many embodiments for creating and defining a recognition-segment. In general a recognition-segment may include a subset (e.g., a part or portion) of the full composition that is chosen because it is quickly recognized by users as being associated with the composition. In general, recognition-segments may be designed and configured so that they will be quickly recognized (within a fraction of a second to a few seconds) by those user(s) who are already familiar with the composition (e.g., have previously heard the composition at least a certain number of times).

In some embodiments, a recognition segment is designed or configured so that it will be recognized within a defined time, by some majority of users who are already familiar with the composition. For example, greater than 50% or 75% or 80% of the users, who are already familiar with the composition, will recognize it within 0.5 seconds, 0.75 seconds or 1 second or 1.5 seconds or 2 seconds. In some embodiments, users that are determined to not have a sufficient level of familiarity (e.g., have not previously heard the composition at least a certain number of times) with a composition, may be excluded from the statistics.

The portion(s) or part(s) of the composition chosen for a recognition-segment may be defined by the composition creator(s), expert(s) and/or focus group(s). For example, the creator(s) or expert(s) many define multiple possible recognition-segments which may then be played to groups of representative users in a test setting representative of a particular user-device context/mode. For example, "A" versus "B" testing may be used. Or as another example, "A" versus "B" versus "C" versus . . . testing may be used. Based on the measured recognition times by the users during testing, the best segment may be chosen for use as a recognition-segment for the composition in that user-device context.

In some embodiments, different potential/prospective recognition-segments may be sample tested with a subset of users (e.g., a sample group of users). In some embodiments, a plurality of different recognition-segments that may be tested/compared for their recognition-times by sample sized groups of users during the normal usage of their user-devices. The recognition-segments may be sample tested in any of the applications of recognition-segments which are described elsewhere in this specification.

In one embodiment, a prospective new recognition-segments (e.g., perhaps created by an expert or artist) may be distributed and tested on a group of users (e.g., a sample sized group of users). The recognition-times of the users in the test group may be captured (during the normal user-device operation) as part of normal user-device feedback and collected by the system for analysis. The recognition-times during the tests may then be analyzed and compared with other recognition-segments for the same composition. The recognition-segment that was recognized the soonest (e.g., had the shortest recognition time) may be selected as the recognition-segment that is used for most/all users.

In one embodiment, the recognition-segment that had the lowest mean or median recognition time is selected for use as the recognition-segment for most/all users.

In another embodiment, the recognition-segment with a low/lowest mean value and small variation across all the measured recognition-time values, is selected as recognition-segment that is used for most/all users. The variation of the measured recognition-times may be analyzed and tested using statistical methods which are known by those skilled in the art. For example, a standard deviation of the measured values may be calculated and evaluated for an acceptable variation across users. In this way, a recognition-segment may be identified that has a shorter recognition-time than the other tested or previously used recognition-segments.

In one embodiment, a user group A may be sample tested with recognition-segment 1. While user group B (a different set of users) may be sample tested with recognition-segment 2. The actual measured recognition-times that were measured with each group may then be analyzed to select the "best" recognition-segment that will be used for all/most users. Of course, many different recognition-segments may be tested for each composition to determine the best one to use with all/most users. Alternatively, user group A may be sample tested with recognition-segment 1 and at a different un-related later time also sample tested with recognition-segment 2.

It is desirable that the selected recognition-segments be substantially immediately recognized by those users that have previously experienced a composition. For example, the recognition-segments may be tested/verified to have a mean or median recognition-time that is less than 0.5 seconds; less than 1 second; less than 2 seconds; or less than 3 seconds, by a user or certain/defined fraction of a group of users (that have previously experienced a composition).

In some embodiments, the length of a recognition-segment may be chosen so that a high percentage of users (e.g., most users that have previously experienced a composition) will recognize the composition before the end of the recognition-segment has finished being played. That is, further increasing the duration of the recognition-segment may not significantly increase the percentage of users that will end up recognizing the composition.

For example, a recognition segment may be defined/selected that will be recognized on average by a group of users in less than 1 second, and high percentage of the group of users (e.g., say more than 99%) will recognize the composition within the recognition-segment length (e.g., playback time duration) of the recognition-segment (say 5 seconds). For example, more than 99% of users (that have previously experienced the composition) will have recognized the composition with a recognition-segment length of 5 seconds. Hence, recognition segments may be defined/selected so that a high percentage of users (for example 90%, or 95%, or 99% or 99.9%) of the users will recognize the recognition-segment with a defined/selected recognition-segment length/duration (e.g., say 3 seconds, or 4 seconds, or 5 seconds) when those users have previously experienced (e.g., heard) the composition, more than number of times or a certain amount.

Those familiar with the art will recognize that a sound-segment may also be defined as a multi-track definition such as stereo channels, quad channels, 5.1 surround sound or other multi-channel audio representations.

A recognition-segment may be defined as an audio segment 204 including a multi-channel audio segment. The recognition-segment may be defined in a separate audio file from the composition 201. For example, the recognition-segment may contain a copy of analog or digital sound samples for the selected portion of the composition.

The recognition-segments may be optionally compressed to reduce their storage and/or transmission capacity and then decompressed before playback to the user.

Alternatively, the recognition-segment may be may be defined by a pointer 202 to the start of the recognition-segment within the full composition 201, along with a duration of the recognition-segment 203. In this case, the analog or digital sound samples may be obtained during playback by accessing a pre-defined portion of the composition.

Figure 2A:
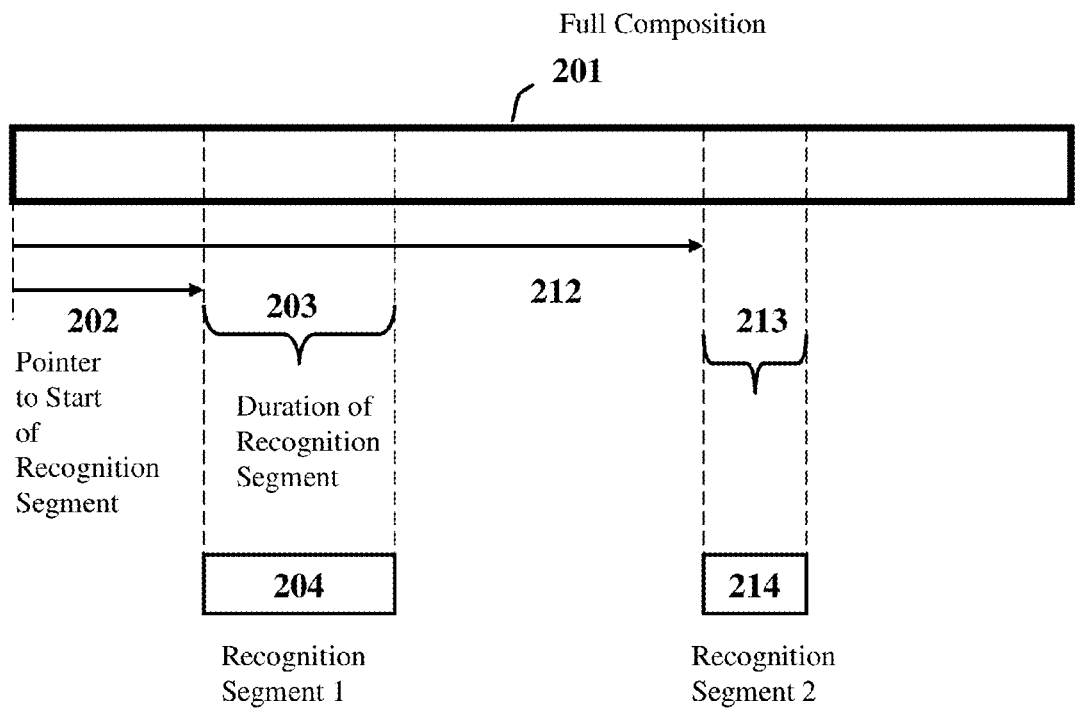
FIGS. 2a-2e illustrate some embodiments for the creation and definition of a recognition-segment.
Figure 2B:
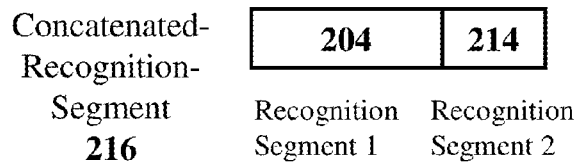

Concatenation of a Plurality of Segments from the Same Composition:

In some embodiments as shown in FIGS. 2a and 2b, the recognition-segment may be defined as a concatenation of a plurality of segments that are from different parts of the same composition. For example, in FIG. 2b, concatenated-recognition-segment 216 may be a concatenation of segment 204 and segment 214.

In some embodiments, a concatenated-recognition-segment may alternatively be defined as a chain or linked-list by using a pointer 212 and segment duration 213 for each following concatenated segment in the chain. In some embodiments, a start symbol and an end-of-concatenation symbol may be used denote the end of segment concatenation.

Figure 2C:
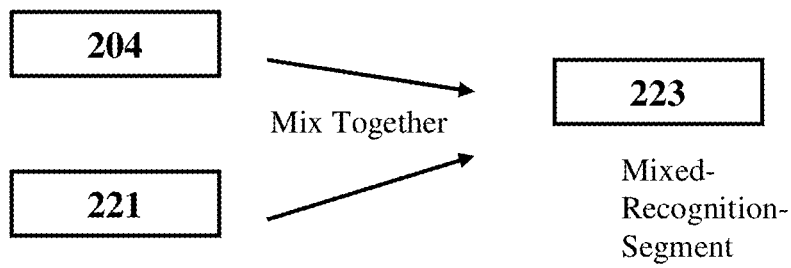

Including Other Audio Information into a Recognition-Segment:

In some embodiments as shown in FIGS. 2a and 2c, a recognition-segment may also be defined as a mix (e.g., addition together) of two (or more) audio tracks. As an example, one track may be a recognizable portion of the composition 204 which is mixed with a second track 221 that contains additional audio information that a user may recognize. The relative amplitudes of the tracks may be adjusted prior to mixing, in-order obtain the desired combined effect. For example, the second track may be an audio description of the composition title and artist. During playback of the mixed-recognition-segment 223, the user will simultaneously hear the descriptive information 221 overlaid on a recognizable portion of the composition 204. In some situations (e.g., contexts or modes), a mixed-recognition-segment may be more quickly recognized by users than just a portion of the composition by itself.

Overlying a Plurality of Segments from the Same Composition:

In some embodiments, sound-segments from a plurality of different parts/locations of the same composition may be simultaneously played back to a user at the same time. The user may be able to recognize many of the individual sound-segments that are simultaneously playing back at the same time. By simultaneously playing back at the same time, a plurality of different sound-segments from the same composition, a user may be able to more quickly recognize and find a composition that they are "looking for". For example, this may be useful for compositions that have multiple different sections/parts that a user(s) may recognize as being associated with the composition. This may allow a user to simultaneously hear and recognize these different sections/parts at the same time, thereby saving time; in comparison to playing a plurality of sections/parts one after another in time (e.g., a concatenation of sound-segments from the same composition).

Figure 2D:
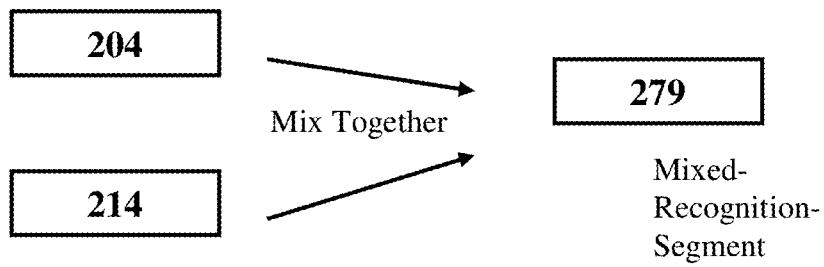

In some embodiments, a recognition-segment may be defined as an overlaying and mixing (e.g., addition together) of a plurality (i.e., two or more) audio tracks that are from different parts of the same composition, so that a plurality of different parts of the same composition may be simultaneously played back at the same time. As an example, as shown in FIGS. 2a and 2d, one track 204 may be a recognizable portion of the composition 201; which is overlaid and mixed with a second track 214 which may be a different recognizable portion of the same composition 201; to create a mixed recognition-segment 279. Simultaneously playing back a plurality of different parts of the same composition at the same time; may allow a user(s) to more quickly recognize a composition.

During playback of the mixed-recognition-segment 279, the user may simultaneously hear a plurality of different recognizable portions (204 and 214) of the composition 201 at the same time. The relative amplitudes of the tracks may be adjusted prior to mixing, in-order obtain the desired combined effect. The time-phasing of the starts of the plurality of tracks and/or their relative amplitudes that are combined may be configured before mixing (e.g., addition together), so that a user is able to more easily recognize each of the recognition-segments when they are overlapped together. In some situations (e.g., contexts or modes), a mixed-recognition-segment of a plurality of portions (e.g., 204 and 214) of a composition 201 may be more quickly recognized by users than just a single portion (e.g., 204) of the composition by itself.

Figure 2E:
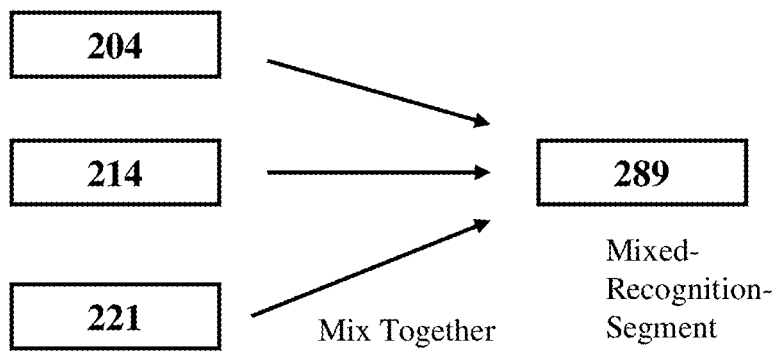

In some embodiments as shown in FIGS. 2a and 2e, a recognition-segment may be defined as a mix (e.g., addition together) of a plurality (i.e., two or more) audio tracks that are from different parts (e.g., 204 and 214) of the composition 201 and another track 221 that contains additional audio information; that a user may recognize. As an example, track 204 may be a recognizable portion of the composition 201; and track 214 may be another recognizable portion of the composition 201; and track 221 may verbally indicate information about the composition (e.g., an audio description of the composition title and artist). The relative amplitudes of the tracks may be adjusted prior to mixing, in-order obtain the desired combined effect. In this embodiment, during playback of the mixed-recognition-segment 279, the user will simultaneously hear a plurality of different recognizable portions (204 and 214) of the composition 201 at the same time. The time-phasing of the starts of the plurality of tracks and/or their relative amplitudes that are combined may be configured before mixing (e.g., addition together) so that a user is able to more easily recognize each of the recognition-segments when they are overlapped together.

In some embodiments, the mixed recognition-segments may be overlaid and mixed together to generate a fixed recognition segment. A different mixed recognition-segment may be generated for each of the different numbers of overlapping segments. That is, there may be a different mixed recognition-segment for two overlapped segments; a different mixed recognition-segment for three mixed overlapped segments; a different mixed recognition-segment for four overlapped segments, etc.

In an alternative embodiment, the mixed overlapped recognition-segments may be dynamically generated prior to use, by overlaying and mixed segments that are defined by pointers and segment lengths. To minimize the delay to the start of a mixed overlapped recognition-segment, the mixed recognition-segments may be dynamically created immediately after the ordering of compositions is established/known.

In another (optional) embodiment, the simultaneous playback (at the same time) of a plurality of sound-segments from different sections/parts of the same composition, may be divided between two or more sound channels. For example, one recognition-segment from a composition may be played only in a stereo right channel, while a different recognition-segment from another location/section of the same composition may be played only in the stereo left channel. For example, referring to FIG. 2a, one track 204 may be a recognizable portion of the composition 201 may be played back only on the right channel; while a second track 214 which may be a different recognizable portion of the same composition 201 may be played back only in the left channel. More generally, by distributing a plurality of the sound-segments differently in volume and/or across the available sound-emitters (e.g., speakers or headphones); each different sound-segment from the same composition, may be made to appear to be occurring at a different location or origination from a different direction in the space around the user. By configuring each sound-segment so that each appears to occur to come from a different direction and/or appears to be located at a different location in space, a user may more identify the simultaneously playing sound-segments for a composition that they are trying to find.

Additional Design Considerations for Recognition-Segments:

In general, any combinations of the above methods of concatenating and/or mixing together overlaid segments (e.g., sound segments), may be used to create or generate recognition-segments.

In some cases, a recognition-segment may not contain a portion of a composition. For example, the recognition-segment may verbally state the composition's title, artist and/or other information related to the composition.

Information sound segments may also be optionally used to verbally inform the user that the user-device is performing certain requested actions or operating in a certain requested mode. For example, a sound segment may verbally state the current user-device context or operating mode or start/end of a operational mode.

In some embodiments, a certain short sound segment (e.g., beep1 or click1) may always be played to indicate to the user that a recognition-segment is starting and a different sound segment (e.g., beep2 or click2) may always be played to indicate that a full composition is starting. In some embodiments, ending sound segments (e.g., beep3 or click3) may be used to indicate the end of a recognition-segment or a recognition-segment mode of operation.

Those skilled in the art will also recognize that recognition-segments may be defined using software objects compatible with object oriented programming methods.

Association of Recognition-Segments to Compositions:

The actual recognition-segments and compositions may be referenced by pointers, links or hyperlinks to their identity and/or location. They may also be identified using universal resource locators (URL's) or a universal object identifier.

Each recognition-segment or composition may be a separate file or group of files. Alternatively, each recognition-segment or composition may be implemented as an object or a group of objects compatible with object oriented programming.

FIG. 3 illustrates an example of the association of a recognition-segment with each composition and an ordering of compositions.

In FIG. 3, a recognition-segment is associated with each composition through the use of a table 300. Those skilled in the art will recognize many alternative ways of specifying the association between each recognition-segment and associated composition including databases, pointers or linked-lists.

The association may also be established using a standardized naming convention (for files, pointers, links, etc). For example the "name" for a recognition-segment may be the same as the composition except for a uniform prefix/suffix which is added to define the recognition-segment's "handle". For example, as shown in FIG. 3, the prefix "RA" may always be appended to the composition's "handle" 305 to define the "handle" of a recognition-segment of type "A" 306.

Each composition may have one or more recognition-segments (i.e., types) associated with it. For example, a simple recognition-segment 204 may be more useful for some situations, while a mixed-recognition-segment 223 or concatenated-recognition-segment 216 may be more useful for other cases. For one user-device mode, a specific type of recognition-segment (e.g., 204) may always be used, while for another user-device mode another type of recognition-segment (e.g., 223) may always be used. In some cases, the user may be given an option to select the type of recognition-segment they prefer for a given mode or situation (e.g., with or without composition title/artist mixed with a portion of the composition).

If the composition had additional types of recognition-segments associated with it, their "handles" may utilize a different standard prefix/suffix (e.g., "RB" and "RE") and an additional column may added to table 300 for each additional recognition-segment type.

In some embodiments, the information in table 300 is used for background processing. The user is not presented with and does not need to see any of the information in table 300.

In an optional embodiment, the user-device may include a user display 415 so the user may see information (e.g., title/artist) as well as an indicator (e.g., highlighting) of the current-location 301 in the ordering and which recognition-segment or composition is currently active.

Ordering of Compositions:

Different user-devices may have different modes and/or operational contexts. Based on user control-actions, a given user-device may switch between several different operating modes and/or contexts. In general, the order of compositions may be determined by the current mode or operating context of the user-device.

In the embodiment shown in FIG. 3, the ordering 304 of compositions in a table 300 may correspond to an ordered set of compositions defined by a current user context.

Examples of ordering for different applications and different user-device modes and/or contexts include:
1) For a disk player user-device (e.g., Compact Disk Player), the order of compositions may be the same order (composition number "1" to "n") that the compositions may be defined on the album (or media) the user has selected.
2) For a device that maintains a history of recent plays, the ordering may be from most recent to least recent composition played.
3) For a set of compositions by an artist (such as an album or collective works). The set may be ordered by highest to lowest estimated user likeability or another order, appropriate to the user's request.
4) For a user-device that maintains a listing of user favorites, the ordering may be in order of user ratings (i.e., from most favorite to least favorite).
5) For a user-device that generates a user customized stream of compositions (for example, based on user feedback about likes and dislikes), the ordering may be the order the compositions were (or will be) played in.
6) For a user-device that can search a library of compositions based on user criteria and generate a list of possible matching compositions, the ordering of compositions (search results) may be from the highest probability to the lowest probability of matching the user's request.
7) For a user-device that accepts user commands and requests, there may be multiple compositions that may meet the request. The order of compositions may be from the highest probability to the lowest probability of matching the user's request. For example, the user makes a verbal request for a particular composition by name but there may be multiple compositions that match the request. The order of compositions may be from most likely to least likely to satisfy the particular user's request.
8) For a set of compositions unknown to a user, the ordering may be from highest to lowest estimated user likeability, based on an analysis of other compositions already known by the user.
9) For a user-device (such as an Apple iPod) that plays compositions based on a playlist or playlists, the order of compositions may be the playlist playback order; alphabetical order; artist order; etc.

Current-Location within an Ordering:

The current-location within an ordering may designate the currently active recognition-segment. Depending on the embodiment, the currently active recognition-segment may be the currently playing recognition-segment (or composition) and/or the most recently played recognition-segment (or composition).

The initial current-location is dependent on the user-device context/mode. For some applications/contexts/modes, the initial current-location may be the recognition-segment associated with the first composition in the ordering.

For other applications/contexts/modes, the initial current-location may be the recognition-segment associated with another composition somewhere else in the ordering. For example, a user-device that allows navigation into both the past and future of a stream/sequence of compositions, the initial current-location may be at the composition currently playing in the stream/sequence.

The current-location (e.g., currently active recognition-segment) may change as a result of each user navigation control-action or as a result of certain types of user inaction.

The "current-location within the ordering" 301 may be defined in software by a pointer (in FIG. 3), variable, variable link, variable hyperlink or object. The current-location may also distinguish between whether the composition or one of its associated recognition-segment(s) is currently playing. Those skilled in the art will recognize many other methods of defining a current-location in an ordering of compositions and associated recognition-segments.

Figure 7:
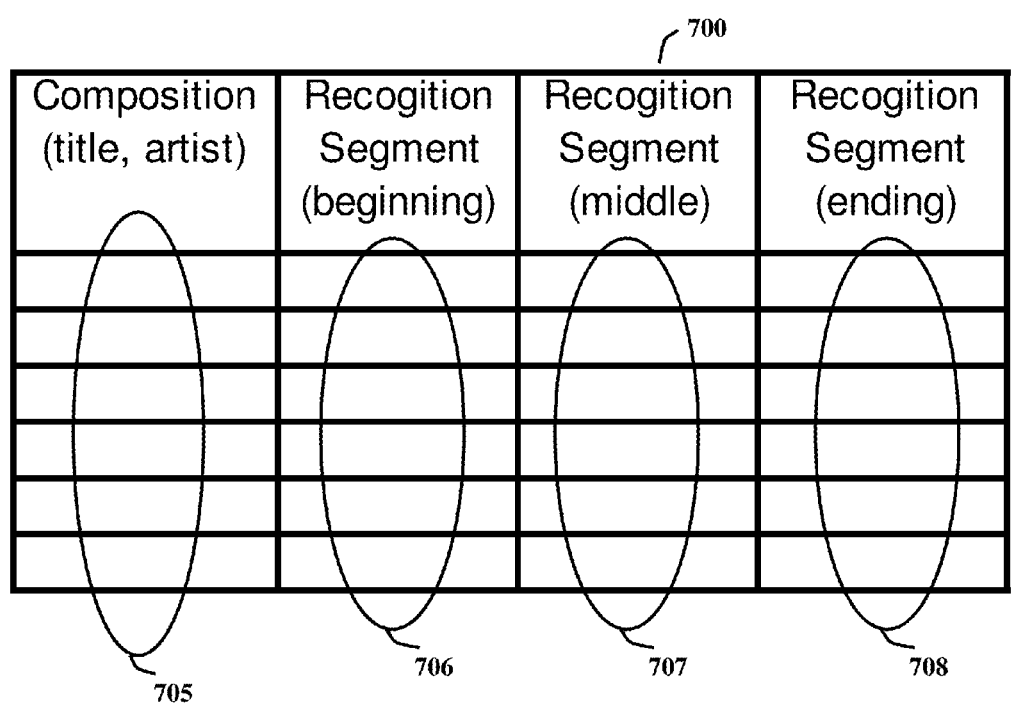
FIG. 7 shows an embodiment of a display screen showing an ordering of compositions and multiple recognition-segments associated with each composition.
Figure 9:
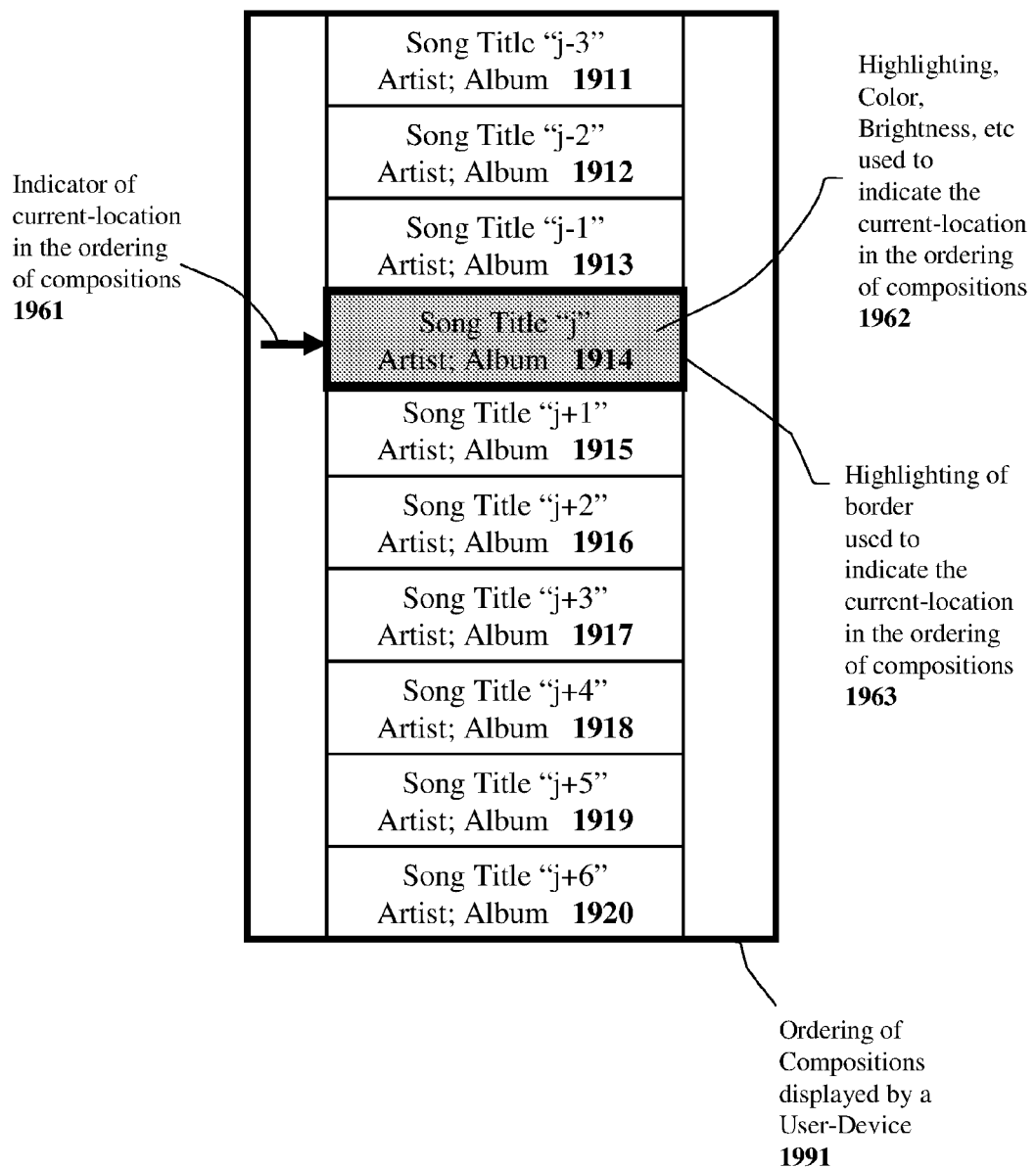
FIG. 9 shows an example of a listing of songs that may be displayed by a user-device.
Figure 10:
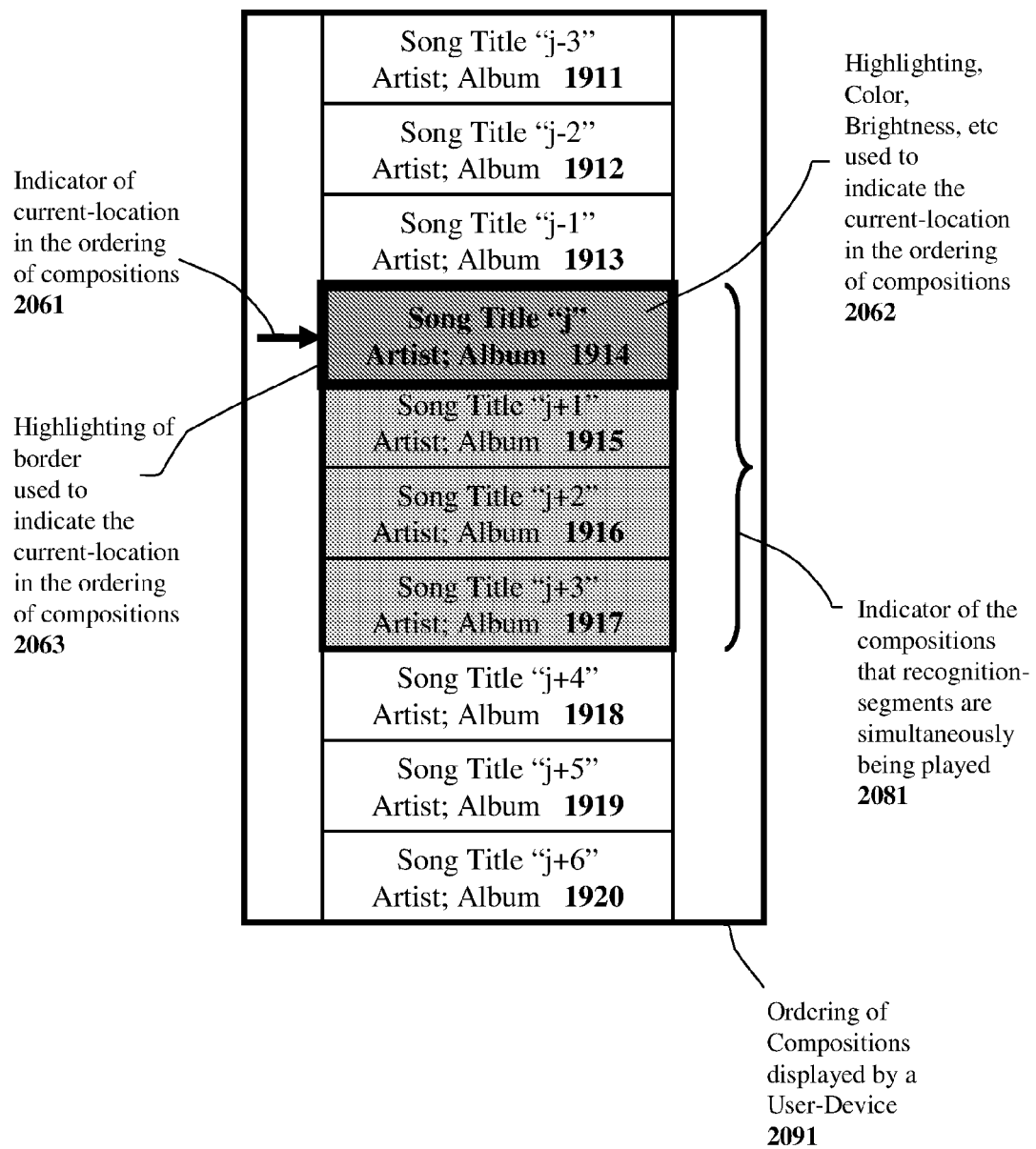
FIG. 10 shows, of a listing of songs that may be displayed on an iPod or similar user-device; for an embodiment where 4 recognition-segments are played back at the same time.

In some embodiments, the current-location (and user-device context) may also be synchronized with and shown on a user-device display 415 for possible viewing by the user. The current-location may be highlighted on the screen/display and the highlighting may change synchronously with current-location changes. FIGS. 7, 9 and 10 (and their descriptions) show example embodiments where the current-location may be displayed on a user-device.

Navigating an Ordering of Recognition-Segments:

When a user navigates an ordering of compositions, the current-location in the ordering of compositions may change to another composition (or item) in the ordering. For example, in an ordering that is a simple listing, navigation may be in the up or down directions; and the current-location may be moved by navigating to another composition that is either up or down from the previous current-location. For example, in an ordering that is a two dimensional table, navigation may be both the up and down direction as well as in the right or left directions. For example, another ordering may be in 3 (or more) dimensions and navigation may be in the any combination of those dimensions.

The many possible ways that a user may navigate though an ordering of compositions (e.g., songs or items) include:
Using the "forward" and/or "back" controls on a user device. See FIG. 4*a*.
Using the "up" and/or "down" (or "left" or "right") directional arrows on a keyboard.
Using a pointing device to select "up" or "down" icons or any other navigation icons or control(s).
Using physical control button or knobs.
Using a menu with navigation commands.
Using a pointing device to moving a cursor over a composition in an ordering and then selecting (e.g., mouse "clicking") on a composition.
Using a pointing device to moving a cursor over a composition in an ordering (recognition-segment plays back on cursor roll-over).

Moving a finger on a 'click-wheel" (e.g., Apple iPod). Moving a finger in the clockwise direction around a "click-wheel" of an Apple iPod.

Swiping or sliding a finger in a certain direction(s) on a touch screen or multi-touch technology display. For example, swiping a finger downward on a touch sensitive display (e.g., touch screen or multi-touch display).

Navigation gestures by a user in front of a gesture recognition device (e.g., Microsoft Kinect). For example, specific arm, hand, eye or other body configurations or movements are recognized as a command(s).

Voice commands (e.g., "move down"; "move down one").

FIG. 1 is a flow diagram illustrating the navigation of recognition-segments and the acting-upon the composition associated with a currently "active" (e.g., currently playing or most recently played) recognition-segment. For illustration purposes, the following discussion of FIG. 1 assumes a user-device similar to that shown in FIGS. 4a-4b; but the concepts apply in a similar manner, for navigation via the navigation controls available at any other user-device(s).

The upper part of FIG. 1 is an example flow diagram for navigating an ordering of recognition-segments.

The navigation of the ordering of recognition-segments starts with "begin play of the recognition-segment at the initial current-location" 100.

If the user activates the "forward" control 101, the user-device may "begin play of the next recognition-segment" 102 in the ordering of recognition-segments.

If the user activates the "back" control 103, the user-device may "begin play of the prior recognition-segment" 104 in the ordering of recognition-segments.

If the user "activates another navigation control" 111, the user-device may take action to move (in a defined way) within the ordering of recognition-segments. Such other navigation control actions 111 may include moving to the beginning or end of the ordering or moving horizontally to another column of recognition-segments (e.g., see FIG. 7). In some optional embodiments, such other navigation control actions 111 may include actions that may alter the ordering of recognition-segments.

If the user "activates an "act-upon" command" 105 while a recognition-segment is playing (i.e., "active"), the user-device may "act-upon the composition that is associated with the currently active (e.g., playing) recognition-segment" 106. Examples of "act-upon" commands include "play" 402 and commands to "add" or "remove" or "move" or "cut" or "copy" or "paste" or "arrange" or "order" (or in general, any type of action that can be taken on a composition) a composition in a playlist.

If the user has not activated an act-upon command by the time the "recognition-segment has finished playing" 107, the user-device may automatically "begin play of the next recognition-segment" 102 in the ordering of recognition-segments.

In another alternative embodiment 115 shown by the dotted line in FIG. 1, if the user has not activated an "act-upon" command by the time the "recognition-segment has finished playing" 107, the user-device may "act-upon the composition that is associated with the currently active (e.g., playing) recognition-segment" 106. [In some other alternative embodiments, if the user has not activated an act-upon command by the time the "recognition-segment has finished playing" 107, the user-device may stop the playback of recognition-segments and wait for a user action that either: acts-upon that associated composition or a user navigation action that changes the current-location to another composition.]

In some embodiments, the user-device(s) may not have a visual display. The user may still navigate the ordering of compositions by using navigation controls such as forward, back, up, down, right, left, etc.

In some embodiments with a display(s), a unique icon and/or text/symbol/image may represent each composition in an ordering of compositions.

In some other embodiments with a display(s), for each composition in an ordering, one or more unique icon(s) and/or text/symbol(s)/image(s) may represent a recognition-segment that is associated with a composition. In some embodiments, a plurality (two or more) of recognition-segments may be associated with each composition in an ordering.

In some embodiments, the ordering of compositions and/or recognition-segments may be 2-dimensions; 3-dimensions; or even higher dimensions (4, 5, etc). As an example of a 2-dimensional ordering, an ordering of recognition-segments may include a plurality of columns and a plurality of rows of different types of recognition-segments. In some embodiments, each column (and/or row) may hold/display an icon and/or text/symbol/image representing different types of recognition-segment.

In the example shown in the playlist build/review application discussed elsewhere (see FIG. 7), there may be 3 columns of recognition-segments representing the beginning, middle (highly recognizable) and ending recognition-segments for each composition.

There may be additional navigation commands to allow navigation in 2-dimensions, 3-dimensions and/or higher dimensions of an ordering. For example, for a 2-dimensional ordering displayed as a table, there may be navigation controls/actions that allow movement through an ordering in the vertical and/or horizontal dimensions of the table.

User-Device Controls & Control Actions:

FIGS. 4a and 4b illustrate some embodiments of a user-device 400. As show in FIGS. 4a and 4b, the controls that a user may activate include:

1) A "Forward" control 401 to indicate a desire to move (i.e., navigation control) to the next composition (or recognition-segment) in the ordering or sequence of compositions.

2) A "Back" control 404 to indicate a desire to move (i.e., navigation control) to the previous composition (or recognition-segment) in the ordering or sequence of compositions.

3) A "Pause" control 403 to indicate a desire to interrupt play of the current audio output, with the ability to continue from the "pause" location when requested by user action at a later time.

4) A "Play" control 402 to indicate a desire to a) continue play of a composition that was "paused" or b) to start play at composition associated with the currently "active" (e.g., playing) recognition-segment in the ordering or sequence of compositions. The "play" control is an example of a user control that "acts-upon" a composition. In other embodiments, other types of user controls that may "act-upon" the associated-composition may be used.

The user-device 400 may also contain an integrated on/off and volume control 405 as well as other controls useful or typically found in an audio device.

The user-device may also contain a display 415 that provides additional information 417 in a visual form to the user about the current playing composition such as song title, album title, artist name(s), and publisher & publication date. The display 415 may also indicate calendar date and time of day 418.

The display 415 may also include a visual indication 416 of whether a recognition-segment or the actual full composition is playing.

As shown in FIGS. 4*a* and 4*b*, the display 415 may indicate for each composition or recognition-segment; the "playback_time_completed/composition_time_duration". The "playback_time_completed/composition_time_duration" (429 and 419) may be shown in a "ratio" (e.g., "A"/"B") format. Showing these two numbers as a ratio (e.g., "A/B") and with a resolution in seconds; provides very useful intuitive information to the user. The ratio provides the user with an indication of the current playback location as a fraction of the whole. The incrementing in seconds provides the user with an indication that the playback-device is operating normally (and is not hung-up due to a problem or waiting for data to be received). Showing the "playback time completed" in seconds also allows a user to refer-to or go to a particular location in the composition.

As shown in the example of FIG. 4*a*, the ratio format (429) of "0:23/3:33" indicates that 0 minutes and 23 seconds of playback has been completed of a 3 minute and 33 second long composition. That is the composition has a "time_duration" of 3 minutes and 33 seconds. And the current playback location is 0 minutes and 23 seconds from the start of the composition.

As shown in the example of FIG. 4*b*, the ratio format (419) of "0:03/0:05" indicates that 3 seconds of playback has been completed of a 0 minute and 5 second long recognition-segment. That is the recognition-segment has a "time_duration" of 0 minutes and 5 seconds. And the current playback location is 0 minutes and 3 seconds from the start of the recognition-segment.

There are many other formats known to those skilled in the art, may be used. For example, the "playback time completed" and "composition_time_duration" may each be displayed with a resolution of "seconds" or "minutes:seconds" or "hours:minutes:seconds".

Another parameter: "playback_time_of remaining_portion_of_composition" may also be used in some embodiments [which would be displayed as "3:10" (e.g., =3:33-0:23) if it were used in the example shown in FIG. 4*a*].

Those skilled in the art will recognize that there are many alternative embodiments of the user-device controls that may be implemented without using actual physical switches and/or physical controls. Such alternatives include 1) a display along with a pointing device (e.g., mouse or touch pad) 2) an interactive touch screen 3) voice command recognition or 4) body-movement command recognition (e.g., recognize specific arm, hand, eye or other body movements as a command). For example, in voice command recognition, the user may speak word(s) or make sound(s) that represent "forward", "back", "play" or "pause" and these may be then recognized by the user-device as a request for the specific control action.

Minimizing Recognition-Segment Playback Delays:

In some embodiments, it is preferable that the user not experience any delay in starting the playback of each recognition-segment; experience a continuous (e.g., non-interrupted) playback of each recognition-segment; and experience a substantially immediate transition from one recognition-segment to another; and when the user changes the current-location, for the user to experience an immediate start of the next recognition-segment. In some embodiments, the complete ordering and all the recognition-segments associated with the compositions in the ordering may be made available well before possible need/use at the user-device. In some embodiments, the complete ordering and all the recognition-segments associated with the compositions in the ordering may be transferred across a network(s) [e.g., local or Internet] and stored in memory at the user-device, immediately after the ordering of compositions has been determined; and implemented so that the user will not experience delays due to network latencies. The ordering of compositions and recognition-segments may be cached and/or pre-loaded into memory at the user-device so that the recognition-segment playback appears to be substantially instantaneous to the user. This is important in embodiments, where the user(s) may recognize a recognition-segment in a fraction of a second (e.g., less than 0.5 seconds or less than 1 second).

Simultaneous Playback of a Plurality of Recognition-Segments from Different Compositions:

In other embodiments, recognition-segments from a plurality of compositions that are at and are adjacent to the current-location within an ordering, may be simultaneously played back to the user at the same time. The user may be able to recognize an individual recognition-segment that is simultaneously playing with other recognition-segments from different compositions. Simultaneously playing back a plurality (e.g., "n") of recognition-segments at the same time, may enable a user to more quickly recognize and find a composition that they are "looking for".

In some of these embodiments, in a two step process, a user may first recognize that a recognition-segment of a composition they are "looking for" is among the "n" (where "n"=2, 3, 4, 5, 6, . . . ) recognition-segments that are simultaneously being played back at the same time. Then, a user may find the specific recognition-segment that they are "looking for", among the "n" recognition-segments that were simultaneously being played back at the same time.

When a user is simultaneously hearing multiple recognition-segments at the same time, the user may move or step the current-location more quickly through the ordering of compositions. For example, when "n" recognition-segments are simultaneously played back, the user may move the current-location by more than 1 step at a time. For example, when 4 recognition-segments are simultaneously being played back ("n"=4), the user may jump the current-location in the ordering by 2, 3 or 4 (i.e., up to "n") positions in the ordering of the compositions, and may still not miss hearing any compositions in the ordering of compositions.

In some embodiments, the recognition-segment and other recognition-segments that are after the current-location in the ordering may also simultaneously played back at the same time. This may provide an easy way for the user to also simultaneously "recognize" the recognition-segments that are ahead (i.e., coming-up) in the ordering; and hence more quickly locate the composition, they are "looking for" among "n" recognition-segments that were simultaneously being played back at the same time.

Figure 15:
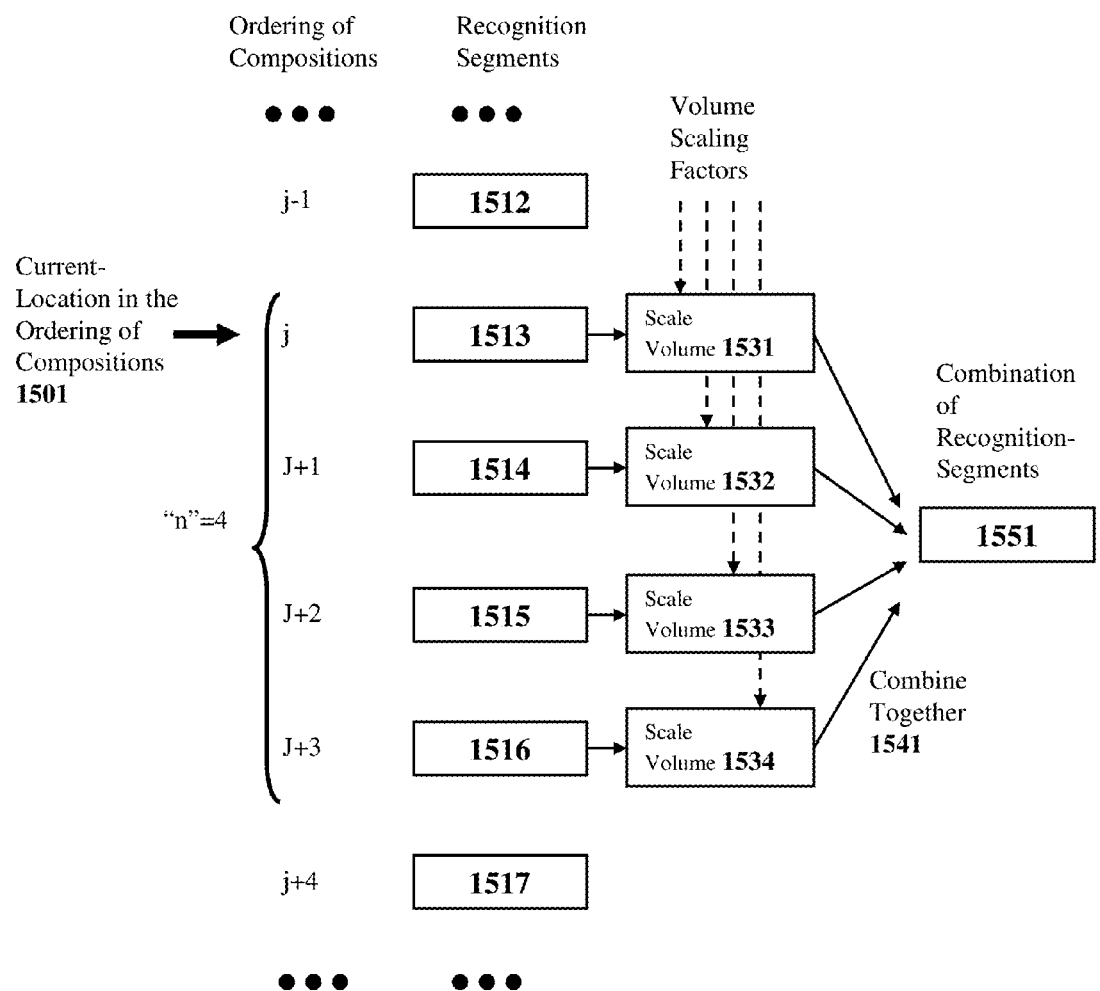
FIG. 15 shows an example of simultaneously playing back a combination of "n" recognition-segments.

FIG. 15 shows an example of simultaneously playing back a combination of "n" recognition-segments for the example ordering of compositions that was shown in FIG. 3 when the current location 1501 is to be at "j"). In this example, recognition segments from 4 (i.e., "n"=4) different compositions, will be simultaneously played back at the same time. In this example, a user may hear a combination of recognition-segments 1551; which is a combination of recognition-segment 1513 from the composition at the current-location (j) in the ordering and recognition-segments (1514, 1515, 1516) from the next 3 compositions ("j+1", "j+2", "j+2") in the ordering. In some embodiments, prior to combining (1541) the recognition segments, the volume of each recognition-segment may be adjusted (e.g., scaled) by volume scale factors (1531, 1532, 1533, 1534), as discussed elsewhere in this specification. In some embodiments, this may be used when the user is navigating downward through the pictured ordering of compositions (by moving the current-location in the direction of higher "j" values in the ordering); so the user may hear at a lower volume, some of the recognition-segments that are "coming up" in the ordering of the compositions.

Figure 16:
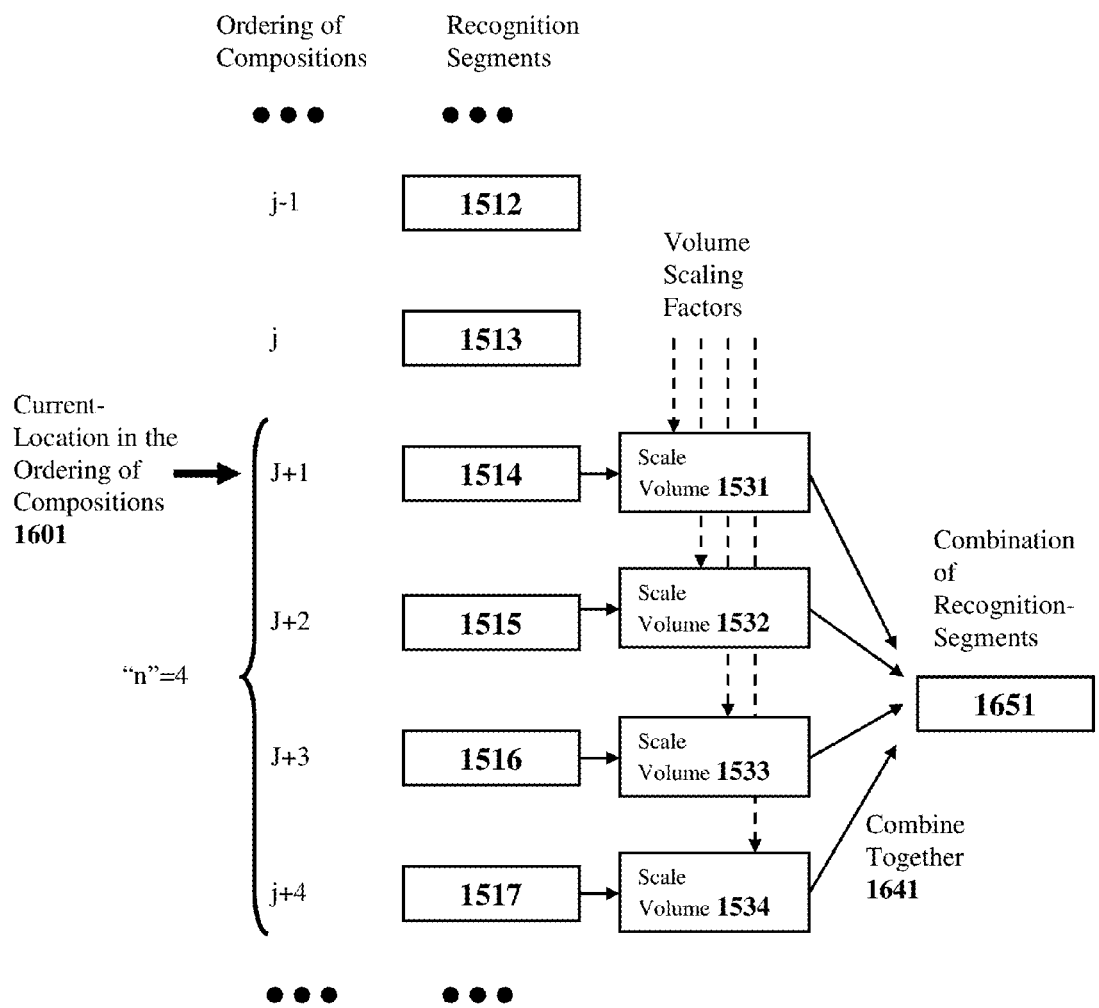
FIG. 16 shows an example combination of recognition-segments, after the current-location has been moved.

FIG. 16 shows an example combination of recognition-segments after the current-location 1601 has been moved forward by 1, from location "j" shown in FIG. 15, to "location j+1" in the ordering. In this example, recognition segments from 4 (i.e., "n"=4) different compositions, will be simultaneously played back at the same time. In this example, a user may hear a combination of recognition-segments (1651); which is a combination of recognition-segment 1514 from the composition at the current-location (j+1) in the ordering and recognition-segments (1515, 1516, 1517) from the next 3 compositions ("j+2", "j+3", "j+4") in the ordering. In some embodiments, prior to combining (1641) the recognition segments, the volume of each recognition-segment may be adjusted (e.g., scaled) by the same volume scale factors (1531, 1532, 1533, 1534) as used in FIG. 15, as discussed elsewhere in this specification.

Figure 17:
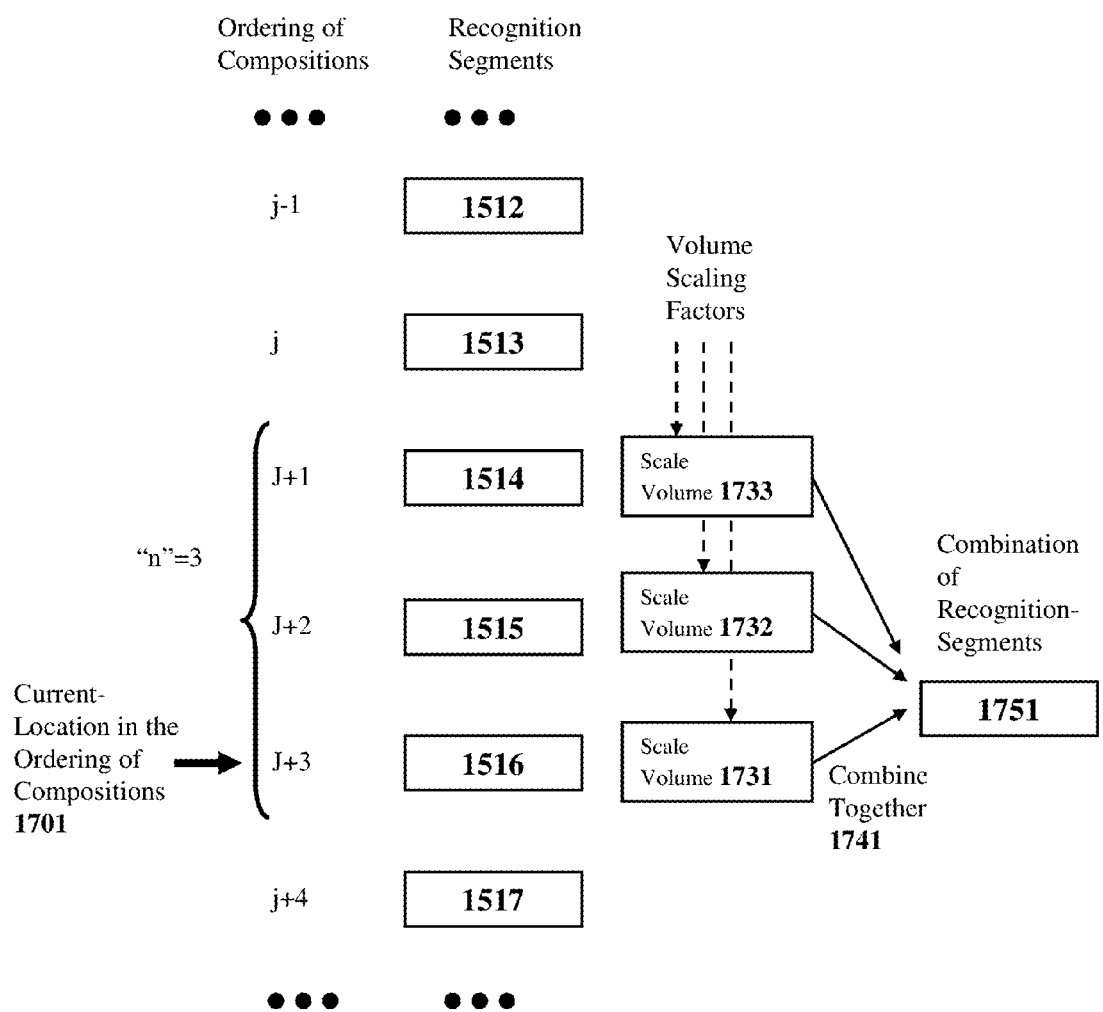
FIG. 17 shows another example of simultaneously playing back a combination of "n" recognition-segments.

FIG. 17 shows an example of simultaneously playing back a combination of "n" recognition-segments for the example ordering of compositions that was shown in FIG. 3, except that the current-location 1701 is assumed to be currently at "j+3". In this example, recognition segments from 3 (i.e., "n"=3) different compositions, will be simultaneously played back at the same time. In this example, a user may hear a combination of recognition-segments 1751; which is a combination of recognition-segment 1516 from the composition at the current-location (j+3) in the ordering and recognition-segments (1515 and 1514) from the earlier compositions ("j+2", and "j+1") in the ordering. In some embodiments, prior to combining (1741) the recognition segments, the volume of each recognition-segment may be adjusted (e.g., scaled) by volume scale factors (1731, 1732, 1733), as discussed elsewhere in this specification. In some embodiments, this may be used when the user is navigating upward through the pictured ordering of compositions, by moving the current-location upward (in the direction of lower "j" values in the ordering); so the user may hear at a lower volume, some of the recognition-segments that are "coming up" as the user moves upward in the ordering of compositions.

Figure 8:
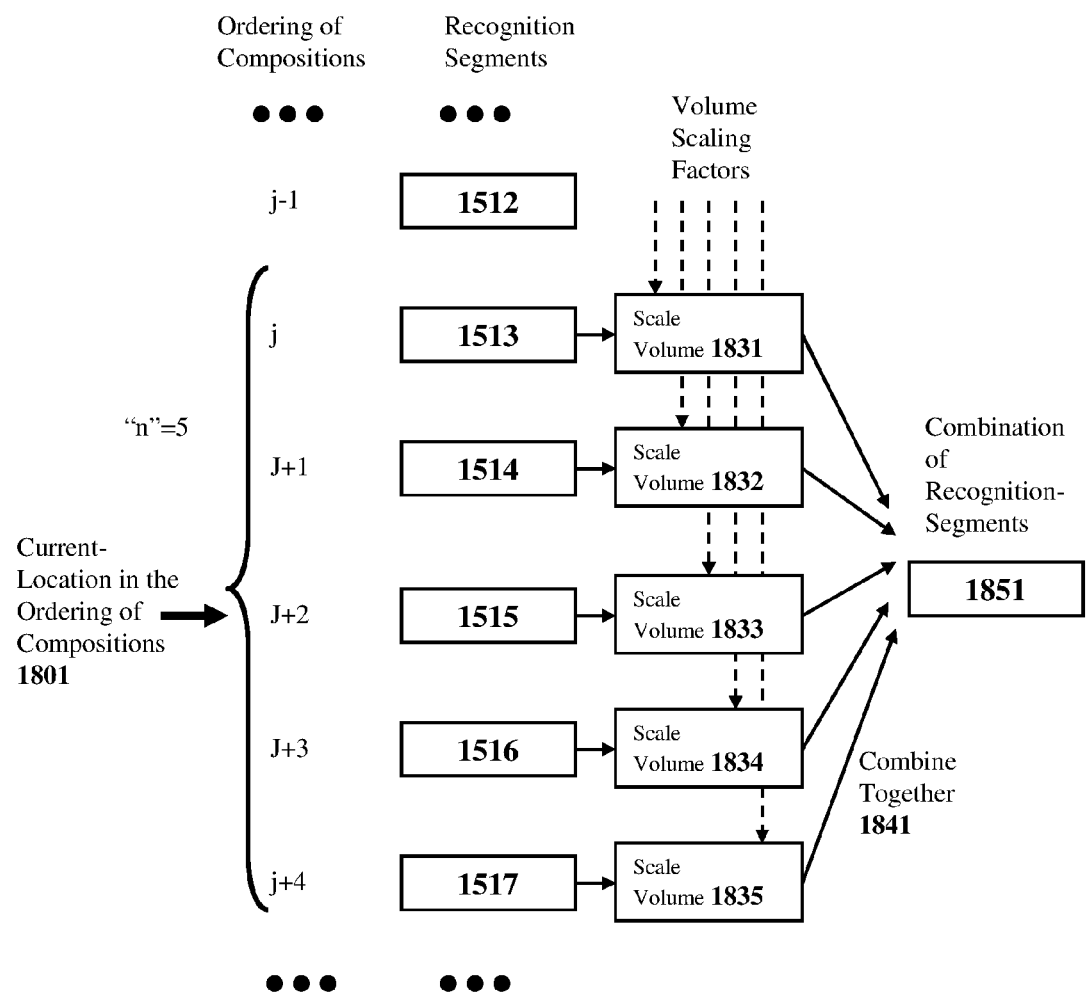
FIG. 8 shows another example of simultaneously playing back a combination of "n" recognition-segments.

FIG. 8 shows an example of simultaneously playing back a combination of "n" recognition-segments for the example ordering of compositions that was shown in FIG. 3, when the current location 1801 is at "j+2". In this example, recognition segments from 5 (i.e., "n"=5) different compositions, will be simultaneously played back at the same time. In this example, a user may hear a combination of recognition-segments 1851; which is a combination of recognition-segment 1515 from the composition at the current-location (j+2) in the ordering and recognition-segments (1513, 1514, 1516, 1517) from the compositions ("j", "j+1", "j+3", "j+4") both before and after, the current-location 1801 in the ordering. In some embodiments, prior to combining (1841) the recognition segments, the volume of each recognition-segment may be adjusted (e.g., scaled) by volume scale factors (1831, 1832, 1833, 1834, 1835), as discussed elsewhere in this specification.

Over time, (through use and experience), a user may increase their skill at finding the recognition-segment they are looking for among a plurality of recognition-segments that are simultaneously being played back at the same time. As a user's skill increases, a user may desire that the number (i.e., "n") of simultaneously playing recognition-segments be increased, so that the user is able to more quickly find a composition they are looking for.

Simultaneous Playback of a Plurality of Recognition-Segments at Different Loudness Levels:

In some embodiments, the playback volume of the recognition-segment at the current-location in the ordering of compositions, may be adjusted to be distinguishably louder than all the other recognition-segments that are simultaneously being played back at the same time. While, the volume of each of the other recognition segments may be played back at a distinguishably (to a typical user) lower volume. This may allow a user to use the difference in volume to more easily identify, which of the simultaneously playing recognition-segments corresponds to the current-location in the ordering of compositions. This may allow the user to more quickly locate a desired composition among the "n" recognition-segments that were simultaneously being played back at the same time.

In some embodiments, the playback volume of the recognition-segment at the current-location in the ordering of compositions, may be adjusted to be distinguishably louder than all the other recognition-segments that are simultaneously being played back; while the volume of each of the other recognition segments may be played back at the same lower volume. For example, in FIG. 15, 1521 may be at the usual volume; while 1522, 1523 and 1524 may be at half the volume of 1521. Note that many other volume ratios such as one third, one quarter, etc may also be used.

In some embodiments, the playback volume of the recognition-segment at the current-location in the ordering of compositions, may be adjusted to be distinguishably louder than all the other recognition-segments; while the volume of each of the other recognition segments is further decreased by the distance the recognition-segment is from the current-location in the ordering of compositions. For example, in FIG. 15, 1521 may be at the usual volume; while 1522 is at half the volume of 1521; and 1523 is at one quarter the volume of 1521 and 1524 is at one eighth the volume of 1521. A user may sense how much a recognition-segment is further ahead (i.e., away from the current location) in the ordering, by how low its volume is relative to the others. Note that in general, many other variations in the relative volume of the recognition-segments may be used, such as logarithmic, linear, exponential, "1/(distance from current-location)", etc.

Simultaneous Playback of a Plurality of Recognition-Segments in Different Sound Channels:

In another (optional) embodiment, the simultaneous playback of a plurality of recognition-segments may be divided between two or more sound channels (e.g., stereo right and left channels). By distributing each of the recognition-segments differently in volume, across the available sound-emitters (e.g., speakers or headphones); each recognition-segment may be made to appear to occurring at in a different direction and/or location in the space around the user. By configuring each recognition-segment so that each appears to occur to come from a different direction and/or appears to be located at a different location in space, a user may more identify which recognition-segment at the current-location and also to more easily recognize a recognition-segment for a composition, they are trying to find.

For example, in the simultaneous playback of "n"=4 recognition-segments shown in FIG. 15, the recognition-segment for the current-location (1513) may be played only in the right channel, while the other recognition-segments (1514, 1515, 1516) that are near/adjacent to the current-location in the ordering may be simultaneously played only in the left channel. How the recognition-segments appear in the left and right channels may be changed or reverse (e.g., user selectable), based on user(s) preferences.

By distributing each recognition-segment at different volumes to the plurality of sound-emitters (e.g., speaker); each recognition-segment may appear to occur at a different physical location relative to the user. In a multi-speaker system, each individual recognition-segment may be variably distributed between the many speakers in-order to make the sound from each particular recognition-segment, to appear to originate from a certain direction and/or certain location in physical space around the user.

Figure 11:
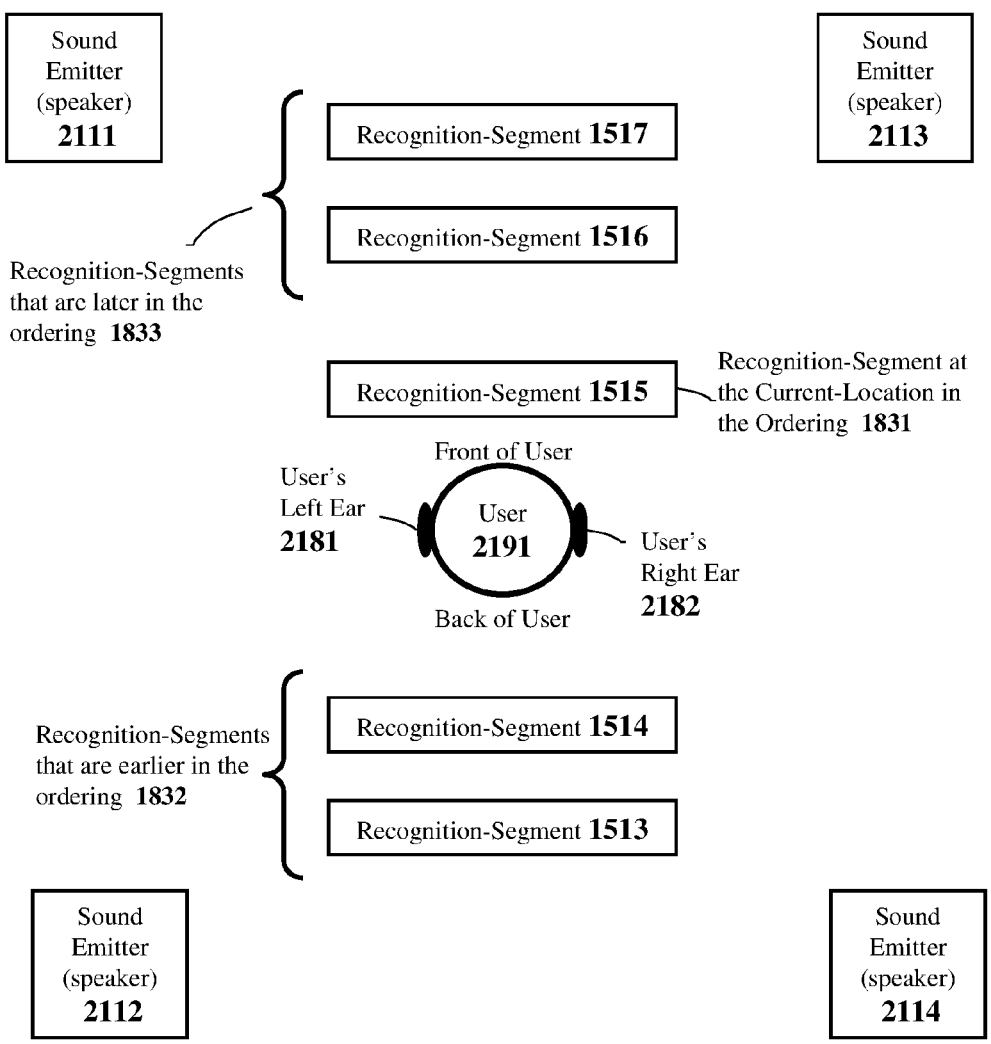
FIG. 11 shows a distribution of the recognition-segments across a plurality of sound emitters (e.g., speakers).

FIG. 11 shows an example of distributing the recognition-segments from the "n"=5 example shown in FIG. 8, across a plurality of sound emitters (e.g., speakers) [2111, 2112, 2113, 2114] that are physically located: around a user 2191 and the user ears 2181 and 2182. The distribution of the recognition-segments in physical space around a user, may be made to correspond to the ordering of the compositions. For example as shown in FIG. 11, the recognition-segment corresponding to the current-location 1515 may be distributed to the speakers so that it appears to be at a physical location that is just in front of the user. As shown in FIG. 11, the recognition-segments that are later (further ahead) in the ordering 1516 and 1517, may be distributed so they appear to be at physical locations 1833 that are further in front of the user, in correspondence with their distance from/ahead-of the current-location in the ordering. As shown in FIG. 11, the recognition-segments that are earlier in the ordering 1514 and 1513, may be distributed so they appear to be at physical locations 1832 that are further behind the user, in correspondence with their distance behind the current-location in the ordering. The directional correspondences may be configured/changed to satisfy the preferences of a user(s).

In general, dependent on the number and locations/positions of sound emitters relative to the user or user's ears the recognition-segments may be placed in 1-dimension, 2-dimensions and/or 3-dimensions in the physical space about a user.

For example, when the ordering is linear listing on a display (e.g., a 1-dimensional case), when the current-location is moved downward on the display, the recognition-segments may sound as if they are moving from right to left (or alternatively right to left); or the recognition-segments may sound as if they are moving from in front of the user to behind the user (or alternatively from behind to the front of the user). Such directional correspondences may be configured/changed to satisfy the preferences of a user(s).

For the case of a 2-dimensional table of recognition segments such as shown in FIG. 7, the recognition segments may distributed in a 2-dimension space around the user. For example, the rows of the table may be configured to correspond to the right and left directions in physical space relative to a user; while the columns of the table (706, 707, 708) may be configured to correspond to the front/ahead and back/behind relative to a user. Such directional correspondences may be configured/changed to satisfy the preferences of a user(s).

Customization of Recognition-Segments for a User(s):

In one optional embodiment, the user may be able set [e.g., via control(s) or menu(s)] whether recognition-segments, that contain a plurality of overlaid sound segments from different parts of the same composition; are either enabled or disabled.

In one optional embodiment, a user may be able set [e.g., via control(s) or menu(s)] whether a division of the sound segments among sound channels is enable or disabled. A user may be able set [e.g., via control(s) or menu(s)] how a plurality of recognition-segments from different parts of the same composition are to be divided among a plurality of sound channels.

In one optional embodiment, the user may be able set [e.g., via control(s) or menu(s)] the duration of recognition-segments (e.g., how long each recognition segment will play for). This may be useful in embodiments where the current-location is automatically moved to the next composition in the ordering, whenever each recognition segment has finished being played back (and then the recognition-segment for the new current-location automatically begins playback). In some embodiments, such as similar to those illustrated in FIG. 7 and FIG. 14, the lengths of the beginning recognition-segments 706; middle recognition-segments 707; and ending recognition-segments 708 may be set by the user.

In one optional embodiment, the user may be able set [e.g., via control(s) or menu(s)] the number ("n") of recognition-segments that are simultaneously played back.

In another optional embodiment, the user may be able set (e.g., via a controls or menus) how the volumes of the "n" recognition-segments that are simultaneously played back, will vary relative to each other. For example, the user may select between logarithmic, linear, exponential, "1/(distance from current-location)", etc, or user-input custom ratios of recognition-segment volumes.

In another optional embodiment, the user may be able set (e.g., via a controls or menus) which recognition-segments adjacent to the current-location in the ordering are simultaneously played back at the same time. For example, the user may be able to choose between recognition-segments that are either before the current-location (e.g., FIG. 15) or after the current-location (e.g., FIG. 17); or recognition-segments that are both before and after the current-location (e.g., FIG. 8).

In another optional embodiment, the user may be able set (e.g., via a controls or menus) the virtual directional location in (a virtual) space about the user, in relation to movements of the current-location on the display. Depending on the embodiment, directional settings may be made in 1-dimension; 2-dimensions and/or 3-dimensions. For example, when the ordering is linear listing on a display (e.g., a 1-dimensional case), when the current-location is moved downward on the display, the recognition-segments may sound as if they are moving from right to left (or alternatively right to left); or the recognition-segments may sound as if they are moving from in front of the user to behind the user (or alternatively from behind to the front of the user).

Examples of Applications Using Recognition-Segments:

Recognition-segments may be used whenever a user wants to locate and/or act upon a specific composition in a group of compositions. Examples of applications and user-devices modes/contexts where recognition-segments may be used to find or act on a composition in a group of compositions include:

1) A set of user favorites ordered from most favorite to least favorite.
2) A set of recent plays ordered from most recent to least recent.
3) A set of compositions by an artist (such as an album or collective works). The set may be ordered by artist creation/release date or highest to lowest estimated user likeability or another order appropriate to the user's request.
4) A set of compositions in a particular genre. The set may be ordered by highest to lowest estimated user likeability or another appropriate order.
5) A set of compositions resulting from a user initiated search. The search results may be ordered from highest to lowest probability of matching the user's request. The search request my have been initiated by any means, including a user's verbal (voice) request for a specific composition, where there may be multiple compositions that match the request.
6) The set of composition on a compact disk (CD), DVD, hard disk drive or other storage medium.
7) Navigating the compositions in a Playback Stream or playlist ordering.
8) Helping a User Build and/or Review a Playlist.
9) Using of Recognition-Segments in an Apple iPod or Similar User-Device:

Additional details of using recognition-segments in these applications are discussed below.

Application: Composition-Finder:

The composition-finder tool may aid the user in finding and playing-back a particular composition in a group of compositions. The composition-finder is particularly useful for audio compositions that contain an audio musical component such as musical recordings (e.g., songs) and music videos. Associated with each composition is a short recognition-segment (sound segment) which has been pre-selected as the most quickly recognized portion of the composition. The recognition-segment may be a fraction of a second to multiple seconds long, representing a highly distinguishable part of the composition. The recognition-segment may be a separately stored sound segment (e.g., separate file). Alternatively, the recognition-segment may be defined by start and end pointers into the full composition itself. The choice of the highly recognizable portion(s) of each composition may be made by the artists, experts, focus groups, or others.

FIG. 6 is a flow diagram of one embodiment of a composition-finder. Entry into the composition-finder mode may occur when the user initiates control action(s) to locate a specific composition in a group of compositions. Referring to FIG. 6, the process begins with an ordering of compositions 608. The finder begins by playing the recognition-segment corresponding to the initial current-location in the ordering of compositions 600. For some applications/modes, the initial current-location may correspond to the first entry in the ordering of compositions. When there is no user control action 602 and the recognition-segment has finished playing 603, the recognition-segment corresponding to the next entry on the ordering of compositions may be played 600. The playing of the recognition-segment for the following entries in the ordering continues until there is user control action. When there is user control action 602, the control action may be recorded 604 as "user history or feedback" and may be associated with the composition that was playing when the user control action occurred. If the control action was "Play" 605a, then the playing of the full composition is begun 606. The full composition is played to the end, unless user control action is taken 602. If the user control action is "Forward" 605c, then the currently played recognition-segment or composition is stopped and play begins on the next recognition-segment on the ordered list 600. If the user control action is "Back" 605b, then the currently played recognition-segment or composition is stopped and play begins on the previous recognition-segment on the ordered list 601. If a user control action other then "Play", "Back" or "Forward" occurs, then the composition-finder mode may be exited and action appropriate to the other control action is performed 607.

Application: Finding a Composition on a CD or DVD or Storage Device:

Recognition-segments may also be used to more quickly find a desired composition on a CD, DVD or any other storage device. The order of compositions may be in the order they occur on the CD, DVD, or storage device. Other ordering schemes (e.g., popularity or user rating) may be used.

When the user activates the appropriate control(s), an audio sequence of recognition-segments may be played. The user may activate the "forward" or "back" controls to more quickly navigate through the recognition-segments. When the user hears the "recognition-segment" for the desired composition, the user activates the "play" control to hear the full composition from the beginning. The use of recognition-segments allows the user to more quickly locate the desired composition, especially compared with using the beginning of each composition which is often not as immediately distinguishable as other portions of the composition.

Application: Resolving an Ambiguous User Request or Search:

Some user-devices may provide a search of a catalog or a user library. The user may make a (possibly verbal) request for a composition(s) by enter/providing search parameters such as artist name or album/composition title. The search results may include multiple compositions and/or there may be multiple compositions that satisfy the search criteria/parameters including cases where there is ambiguity of the request.

For example, the user may verbally request a composition by title (and possibly artist) for which there may be multiple versions of the composition that match the user's request (e.g., multiple studio and live-concert versions by the same artist). The list of compositions satisfying the request may be ordered based on probability of matching the user's request. Recognition-segments may then be used to quickly find the desired composition.

Another example is a user request for the compositions by an artist. The compositions by the artist may be ordered by popularity, creation/release date, user rating or other ranking schemes. The user may activate the "forward" or "back" controls to more quickly navigate through the recognition-segments to find and select the desired composition(s) for playback.

Application: Finding a Particular Favorite Composition of a User:

Some user-devices may maintain a user's ratings of compositions that the user has heard or that may be in the user's library. The composition-finder to help the user find a specific favorite composition for immediate playback.

Based on data in the user's playback-history or the user ratings of compositions, a list of the user's favorites may be ordered from currently most favorite to least favorite. When the user activates the appropriate control(s), an audio sequence of recognition-segments, in order of most favorite to least favorite, may be played for the user. The user may activate the "forward" or "back" controls to more quickly navigate through the recognition-segments.

When the user hears the "recognition-segment" for the desired composition, the user activates the "play" control to hear the full composition from the beginning. The use of recognition-segments allows the user to more quickly locate the desired composition, especially compared with using the beginning of each composition which is often not as immediately distinguishable as other portions of the composition.

Application: Navigating a Playback Stream:

Some user-devices may automatically provide a stream of compositions for a user. Some user-devices may allow a user to navigate "backward" and "forward" through this stream of compositions. For example, a user may decide to replay a song (e.g., the 5th previous song) in the stream by activating the "back" (and if necessary "forward") controls until the desired song is reached.

In this case, the order of compositions (and recognition-segments) is the stream play order. Each time the "back" control is activated a recognition-segment for the previous composition in the stream is played. When the user hears the recognition-segment for the desired song, the user activates the "play" control which begins playback of the full composition the user desired to hear. If the user went too far back, the user may activate the "forward" control to move to the next composition in the stream history. In this manner, a user can more rapidly navigate "back" or "forward" through the prior history of a stream of compositions to find a desired composition or review the stream history.

In another option enhancement, the user may also be allowed to navigate through the future stream of compositions that the user-device has not yet played. In this case, the order of compositions (and recognition-segments) is the future stream play order. Each time the user activates the "forward" control, the user-device may "act-upon" the associated composition. Examples of "acting-upon" the associated composition include "adding" or "removing" the associated composition from the future stream or immediately "playing" the full associated composition. In this manner, a user can more rapidly navigate through the future stream of compositions to find a desired composition or to review and optionally even alter the future stream.

By combining these two ways of using recognition-segments, a user can quickly and seamlessly navigate through both the prior history and future order of a stream of compositions.

Application: Helping a User Build, Modify and/or Review a Playlist:

In some embodiments of user-devices a user to may manually select compositions from a library of compositions, in-order to create a customized ordered playlist of compositions. In some embodiments, a display may present to a user with a visual listing of compositions that are available from a library and a visual listing of the playlist selections by composition title and artist. The user may add or remove compositions from the playlist by interacting with a display. When the user is uncertain what the composition is by its textual information (e.g., text showing the composition title and/or artist), a recognition-segment(s) may be played so the user can quickly decide by hearing a highly recognizable portion of the composition.

Recognition-segments may also be used to build, modify and/or review the order and content of a playlist. The compositions may be ordered by playlist order. The recognition-segments allow the user may rapidly hear and navigate ("back" and "forward") through the playlist ordering of compositions in-order to review the playlist selections and their order (and perhaps optionally add or delete compositions or re-order the compositions).

When building their playlist, some users may desire to have a particular transition effect from each composition to the following composition in the playlist. For this case, the user building the playlist may also be interested in both the beginning portion and end portion of each composition as well as a highly recognizable portion from the middle of the composition. For this case, it may be desirable to define three separate recognition-segments (beginning, middle and ending segments) that a user can select during playlist review.

Alternatively, as discussed elsewhere, a single concatenated-recognition-segment may be defined as a concatenation of the beginning, middle (highly recognizable) and ending portions of the composition. When such concatenated-segments may be played back in playlist sequence, the user can quickly review both the compositions and transitions between compositions. A user may more quickly build and review their playlist by interacting with associated recognition-segments of each composition.

In some embodiments, an ordering may have a plurality of recognition-segments that are associated with each composition in an ordering. FIG. 7 shows an embodiment of a display screen showing an ordering 700 of compositions and multiple recognition-segments associated with each composition. The display may be suitable for the building/modifying/reviewing a playlist of compositions.

FIG. 7 shows an embodiment of a display screen showing an ordering 700 of compositions and multiple (i.e., a plurality of) recognition-segments associated with each composition. Composition information 705 such as title and artist may be displayed. In FIG. 7, three types of recognition-segments are associated with each composition. These recognition-segments may contain the beginning 706, the middle (highly recognizable) 707, and the ending 708 portion of each musical composition.

In some embodiments, only two recognition-segments may be associated with each composition in an ordering. For example, a beginning sound-segment and ending sound-segment may be associated with each composition in an ordering. This may enable to more easily create a playlist order with a desired transition and/or compatibility, between the end of one composition and the beginning of the next composition in the playlist.

In some embodiments, a default value for the length/duration of the ending sound-segment may be defined. This value may also be optionally input/defined by the user. Typical values for the length duration of the ending sound-segment may range from 2 to about 8 seconds (with 3, 4 or 5 seconds as common). For example, if the length/duration of the ending segment is set to 5 seconds then the last 5 seconds of the associated composition is played, when user navigation activates causes the ending sound-segment to be played.

In some embodiments, a default value for the length/duration of the beginning sound-segment may be defined. This value may also be optionally input/defined by the user. Typical values for the length duration of the beginning sound-segment may range from 3 to about 10 seconds (with 4 to 8 seconds as common). For example, if the length/duration of the beginning segment is set to 6 seconds then the first 6 seconds of the associated composition is played, when user navigation activates causes the beginning sound-segment to be played.

In some embodiments, the user may have an option to over-ride the default length/duration values, by inputting/defining the lengths/durations of each of the individual ending sound-segments or beginning sound-segments.

In some embodiments, the display (e.g., for example shown in FIG. 7) may be defined using HTML (hyper-text markup language). The composition information 705 (e.g., title, artist) may appear as the HTML hyperlink anchor-text, with the actual composition pointer 705 defined as the hyperlink address or universal resource locator (URL). Each recognition-segment may be similarly defined with anchor-text (or symbol to represent the recognition-segment) along with an underlying hyperlink address (e.g., URL).

Figure 14:
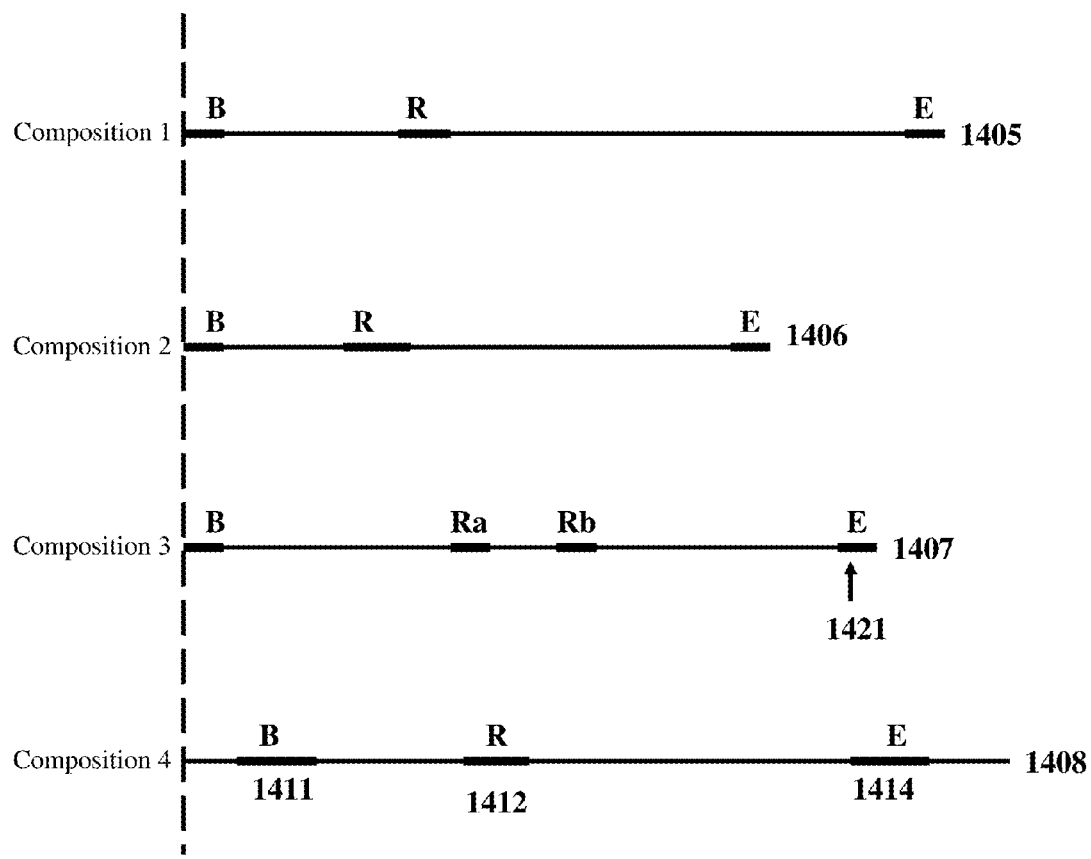
FIG. 14 illustrates another example of how an ordering of compositions may be displayed for a user on a portion of a display or in a window on a display.

FIG. 14 illustrates another example of how an ordering of compositions may be displayed for a user on a portion of a display or in a window on a display. The length/duration of each composition (1405, 1406, 1407, 1408) may be indicated. The title (and artist) may be displayed for each composition that is displayed. The locations of the beginning sound-segment [B], recognition sound-segment(s) [R] and ending sound-segment [E] may be shown on the display for the user.

Composition3 (1407) shows an example of a composition with two recognition sound-segments (Ra and Rb).

Composition4 (1408) shows an example of where a user has (optionally) defined a unique (non-default) location and duration/length of the beginning sound-segment (1411). Composition4 (1408) also shows an example of where a user has (optionally) defined a unique (non-default) location and duration/length of the ending sound-segment (1411). A user may interactively manipulate the symbols for the sound-segments in-order to change their locations and/or duration/length.

To add a composition to the ordering, the user may "drag" or insert another composition to a desired location in the shown ordering of compositions. For example, a composition "x" may be dragged or inserted between composition1 (1405) and composition2 (1406). Similarly, a user may delete or cut a composition from the shown ordering.

To change the location of a composition in the ordering, the user may drag or cut/paste a composition (e.g., say from a library listing) to the desired location in the shown ordering of compositions (e.g., say a playlist). For example, the user may drag composition2 (1406) to occur after composition4 in the ordering.

The display may be synchronized with the user navigation control actions and the currently active (e.g., playing) recognition-segment or composition may be indicated using display highlighting methods such as a using different display color, boldness, brightness and/or other method.

The interactive display may also allow a user to define the transition from each composition to its following composition. The interactive display may allow a user to define a duration/length of "silence" between the end of one composition and the start of the following composition. The interactive display may also allow a user to define the amount of overlap (mixing/combination) that occurs at the end of one composition and the beginning of the following composition. For example, an up-arrow (1421) may be used to indicate that a portion of composition3 (1407) is to overlap and be played simultaneously with the start of composition4 (1408).

Application: Use of Recognition-Segments in an Apple iPod or Similar User-Device:

Some Apple iPod devices (and similar devices) have a "click wheel" to allow users to move up and down in a listing or ordering of items such as a playlist of songs; alphabetical listing of songs; list of songs in an artist's album; catalog listing of songs; albums; artists; etc. A user may slide one of their fingers along the "click wheel" in the clockwise direction to move down a list of items (e.g., songs) and may slide one of their fingers along the "click wheel" in the counter-clockwise direction to move up a list of items (e.g., songs).

Other Apple iPod devices (and similar devices) have a touch screen display technology where a user may swipe (e.g., drag one of their fingers in an upward or downward on the displays surface) to move up and down in a listing or ordering of items such as a playlist of songs; alphabetical listing of songs; list of songs in an artist's album; catalog listing of songs; albums; artists; etc. A user may drag one of their fingers in a downward direction on the displays surface, to move down a list of items (e.g., songs). A user may drag one of their fingers in an upward direction on the displays surface, to move up a list of items (e.g., songs).

One or more recognition-segment mode(s) may be incorporated into the various iPod devices (a user-device) and similar user-devices (e.g., Smart-phone; Apple iPhone; tablet-device; iPad; etc). When in a recognition-segment mode, a current-location is defined and indicated in an ordering of items; and the current-location in the ordering is moved as the user navigates through or around the ordering of items. When in a recognition-segment mode, each time the current-location is changed by user navigation of the ordering; a recognition-segment that is associated with the current-location in an ordering of items may be played by the user-device.

FIG. 9 shows an example, of a listing of songs that may be displayed on an iPod or similar user-device. At each moment in time, a current-location 1961 may be defined and indicated in an ordering of compositions (e.g., songs) 1991 on a display. As a user uses the "click-wheel" or finger-swipes on the display (or other gestures) to navigate up and/or down through an ordering of compositions 1991, the current-location may change. Each time the user navigates to a new current-location, a recognition-segment associated with the composition at the current-location 1914 is played back for the user. For example, when user navigation causes the current-location to arrive at "Song Title "j"", then a recognition-segment associated with "Song Title "j"" is played back for the user. If user navigation (in the downward direction) then causes the current-location to move to "Song Title "j+1"", then a recognition-segment associated with "Song Title "j+1"" (1915) is played back for the user. The use of recognition-segments may allow a user to more quickly recognize and/or find a composition (e.g., song) in an ordering of compositions, when navigating the ordering on an iPod or similar device.

As shown in FIG. 9, a symbol or icon (e.g., an arrow; 1961) may be used to indicate which composition 1914 is at the current-location in the ordering 1991. In addition, the composition that is at the current location (1914) may be visually distinguished (1962) from the other compositions in the ordering 1991, by the use of different highlighting; color(s); brightness; etc and/or use of a highlighted border 1963 around the composition 1914 at the current-location.

FIG. 10 shows, of a listing of songs that may be displayed on an iPod or similar user-device; for an embodiment where "n"=4 recognition-segments are played back at the same time. At each moment in time, a current-location 2061 may be defined and indicated in an ordering of compositions (e.g., songs) 1991 on a display. As a user uses the "click-wheel" or finger-swipes on the display (or other gestures) to navigate up and/or down through an ordering of compositions 2091, the current-location may change. Each time the user navigates to a new current-location, a recognition-segment associated with the composition at the current-location 1914 is played back for the user. For example, when user navigation causes the current-location to arrive at "Song Title "j"", then a recognition-segment associated with "Song Title "j"" is played back for the user. If user navigation (in the downward direction) then causes the current-location to move to "Song Title "j+1"", then a recognition-segment associated with "Song Title "j+1"" (1915) is played back for the user. The use of recognition-segments may allow a user to more quickly recognize and/or find a composition (e.g., song) in an ordering of compositions, when navigating the ordering on an iPod or similar device.

As shown in FIG. 10, a symbol or icon (e.g., an arrow; 2061) may be used to indicate which composition 1914 is at the current-location in the ordering 2091. In addition, the composition that is at the current location (1914) may be visually distinguished (2062) from the other compositions in the ordering 2091, by the use of different highlighting; color(s); brightness; etc and/or use of a highlighted border 2063 around the composition 1914 at the current-location. In addition, a symbol or icon 2081 may be used to indicate which "n" compositions (1914, 1915, 1916, 1917) are having their associated recognition-segments simultaneously being played. In addition, the other compositions that have recognition-segments simultaneously being played back but are not at the current location (1915, 1916, 1917) may also be visually distinguished from the other compositions in the ordering 2091, by the use of different highlighting; color(s); brightness; etc and/or use of a highlighted border.

Some Additional Embodiments

One embodiment may be described by the following:
An apparatus-implemented method to help users to find and play compositions that contain an audio component, the method comprising:
  storing in a memory or memories, an ordering of recognition sound-segments; wherein one recognition sound-segment is designated as the active location in the ordering; wherein each recognition sound-segment includes a portion of a composition that will be recognized by a user who has previously experienced the composition; wherein each recognition sound-segment does not begin with the beginning of the composition;
  initiating the playback of the recognition sound-segment that corresponds to the initial active location in the ordering of recognition sound segments;
  automatically changing the active location in the ordering:
    when user navigation control action or actions are detected that indicate the active location is to be changed to another recognition sound-segment in the ordering, or
    when the recognition sound-segment that corresponds to the currently active location, has completed playback;
  responsive to each change of the active location in the ordering, substantially immediately initiating the playback of the recognition sound-segment that corresponds to the new active location; and
  responsive to the detection, by the apparatus, of a user control action indicative of a play command; initiating the playback, from the beginning, of the complete composition that is related to the recognition sound-segment which is currently playing.

Another embodiment may be described by the following:
Music or Entertainment Playback Apparatus, comprising:
  a memory or memories, to store an ordering of recognition sound-segments; wherein one recognition sound-segment is designated as the active location in the ordering; wherein each recognition sound-segment includes a portion of a composition that will be recognized by a user who has previously experienced the composition; wherein each recognition sound-segment does not begin with the beginning of the composition; and
  a processor or processors configured to
    initiate the playback of the recognition sound-segment that corresponds to the initial active location in the ordering of recognition sound segments;
    automatically change the active location in the ordering:
      when user navigation control action or actions are detected that indicate the active location is to be changed to another recognition sound-segment in the ordering, or
      when the recognition sound-segment that corresponds to the currently active location, has completed playback;
    respond to each change of the active location in the ordering by: substantially immediately initiating the playback of the recognition sound-segment that corresponds to the new active location;
    respond user control action indicative of a play command by: initiating the playback, from the beginning, of the complete composition that is related to the recognition sound-segment which is currently playing.

Another embodiment may be described by the following:
An apparatus-implemented method to help users arrange or organize a group of compositions, where each composition contains an audio component, the method comprising:
  storing in a memory or memories, an ordering of recognition sound-segments; wherein one recognition sound-segment is designated as the active location in the ordering; wherein each recognition sound-segment includes a portion of a composition that will be recognized by a user who has previously experienced the composition; wherein each recognition sound-segment does not begin with the beginning of the composition; wherein a recognition-segment was chosen, from a plurality of alternative sound-segments that were created for a given composition, based on how quickly users were able to recognized each one of the alternative sound segments for the given composition;
  initiating the playback of the recognition sound-segment that corresponds to the initial active location in the ordering of recognition sound segments;
  automatically changing the active location in the ordering:
    when user navigation control action or actions are detected that indicate the active location is to be changed to another recognition sound-segment in the ordering, or
    when the recognition sound-segment that corresponds to the currently active location, has completed playback;
  responsive to each change of the active location in the ordering, substantially immediately initiating the playback of the recognition sound-segment that corresponds to the new active location; and
  responsive to the detection of an arranging or organizing control action taken by a user, acting upon the composition that is related to the currently playing recognition sound-segment, to effect the use or location of the related composition within the group of compositions.

Another embodiment may be described by the following:
One or more storage memory or medium, having computer-readable instructions thereon which, when executed by one or more computing devices, implements the method of:
  storing in a memory or memories, an ordering of recognition sound-segments; wherein one recognition sound-segment is designated as the active location in the ordering; wherein each recognition sound-segment includes a portion of a composition that will be recognized by a user who has previously experienced the composition; wherein each recognition sound-segment does not begin with the beginning of the composition;
  initiating the playback of the recognition sound-segment that corresponds to the initial active location in the ordering of recognition sound segments;

automatically changing the active location in the ordering:
- when user navigation control action or actions are detected that indicate the active location is to be changed to another recognition sound-segment in the ordering, or
- when the recognition sound-segment that corresponds to the currently active location, has completed playback;

responsive to each change of the active location in the ordering, substantially immediately initiating the playback of the recognition sound-segment that corresponds to the new active location; and responsive to the detection, by the user-device, of a user control action indicative of a play command; initiating the playback, from the beginning, of the complete composition that is related to the recognition sound-segment which is currently playing.

Another embodiment may be described by the following:

An apparatus-implemented method to help users to find and play compositions that contain an audio component, the method comprising:
storing in a memory or memories, an ordering of recognition sound-segments; wherein one recognition sound-segment is designated as an initial active location in the ordering; wherein each recognition sound-segment includes a portion of a composition that will be recognized by a user who has previously experienced the composition; wherein each recognition sound-segment does not begin with the beginning of the composition;
initiating the playback of the recognition sound-segment that corresponds to the initial active location in the ordering of recognition sound segments;
changing, by the apparatus, the active location in the ordering:
- when user navigation control action or actions are detected that indicate the active location is to be changed to another recognition sound-segment in the ordering, or
- when the recognition sound-segment that corresponds to the currently active location, has completed playback;

responsive to each change of the active location in the ordering, initiating a playback of the recognition sound-segment that corresponds to the new active location; and responsive to a detection, by the apparatus, of a user control action indicative of a play command; initiating the playback, from the beginning, of the complete composition that is related to the recognition sound-segment which is currently playing.

Another embodiment may be described by the following:

A method to help a user find and act-upon a composition containing an audio component, the method comprising:
providing one or more sound-segments that are associated with each composition in an ordering of compositions;
playing one or more said associated sound-segments while navigating said ordering of compositions;
acting-upon the composition associated with the currently active sound-segment, when initiated by user control action or user inaction;
whereby a user can quickly locate and act-upon a desired composition by hearing a sound-segment associated with said composition.

Another embodiment may be described by the following:

A method to help a user find and act-upon a composition containing an audio component, the method comprising:
providing one or more sound-segments that are associated with each composition in an ordering of compositions;
playing one or more said associated sound-segments while navigating said ordering of compositions;
acting-upon the composition associated with the currently active sound-segment, when initiated by user control action or user inaction;
whereby a user can quickly locate and act-upon a desired composition by hearing a sound-segment associated with said composition.

Another embodiment may be described by the following:

An apparatus-implemented method to help a user to arrange or organize compositions that contain an audio component, the method comprising:
utilizing or providing, at a user-device, an ordering of sound-segments and compositions; wherein at least three different sound-segments are related to each composition, wherein the three sound segments include:
- a first sound-segment that comprises a beginning portion of the composition,
- a second sound-segment that is a recognition sound-segment; wherein a recognition sound-segment comprises a portion of the composition that will be substantially immediately recognized by the user who has previously experienced the related composition; and
- a third sound-segment that comprises an ending portion of the composition;

playing a plurality of said sound-segments including at least one recognition sound-segment, while the user is navigating said ordering of sound-segments; and responding to action by the user; to arrange or organize the composition that is related to a sound-segment which is playing or currently active.

Another embodiment may be described by the following:

An apparatus-implemented method to help a user to arrange or organize compositions that contain an audio component, the method comprising:
utilizing or providing, at a user-device, an ordering of sound-segments and compositions; wherein at least two different sound-segments are related to each composition, wherein the two sound segments include:
- a first sound-segment that comprises a beginning portion of the composition or an ending portion of the composition;
- a second sound-segment that is a recognition sound-segment; wherein a recognition sound-segment comprises a portion of the composition that will be substantially immediately recognized by the user who has previously experienced the related composition;

playing a plurality of said sound-segments including at least one recognition sound-segment, while the user is navigating said ordering of sound-segments; and responding to action by the user; to arrange or organize the composition that is related to a sound-segment which is playing or currently active.

Another embodiment may be described by the following:

Music or Entertainment Playback Apparatus, comprising:
a memory or memories, to store an ordering of recognition sound-segments; wherein one recognition sound-segment is designated as a current-location in the ordering; wherein each recognition sound-segment includes a portion of a composition that will be recognized by a user who has previously experienced the composition;

wherein some recognition sound-segments do not begin with the beginning of the composition; and a processor or processors configured to initiate the playback of the recognition sound-segment that corresponds to the current-location in the ordering of recognition sound segments;

automatically change the current-location in the ordering:

when user navigation control action or actions are detected that indicate the current-location is to be changed to another recognition sound-segment in the ordering, or when the recognition sound-segment that corresponds to the current-location, has completed playback;

respond to each change of the current-location in the ordering by: initiating the playback of the recognition sound-segment that corresponds to a new current-location;

respond to a user control action indicative of a play command by: initiating the playback, from the beginning, of the composition that is related to the recognition sound-segment at the current-location in said ordering.

Another embodiment may be described by the following:

One or more storage memory or medium, having computer-readable instructions thereon which, when executed by one or more computing devices, implements the method of:

storing in a memory or memories, an ordering of recognition sound-segments; wherein one recognition sound-segment is designated as the active location in the ordering; wherein each recognition sound-segment includes a portion of a composition that will be recognized by a user who has previously experienced the composition; wherein each recognition sound-segment does not begin with the beginning of the composition;

initiating the playback of the recognition sound-segment that corresponds to the initial active location in the ordering of recognition sound segments;

automatically changing the active location in the ordering:

when user navigation control action or actions are detected that indicate the active location is to be changed to another recognition sound-segment in the ordering, or when the recognition sound-segment that corresponds to the currently active location, has completed playback;

responsive to each change of the active location in the ordering, substantially immediately initiating the playback of the recognition sound-segment that corresponds to the new active location; and responsive to the detection, by the user-device, of a user control action indicative of a play command; initiating the playback, from the beginning, of the complete composition that is related to the recognition sound-segment which is currently playing.

Another embodiment may be described by the following:

An apparatus-implemented method for helping a user to find and act-up compositions that contain an audio component, the method comprising:

storing in a memory or memories, an ordering of recognition sound-segments that are related to compositions that contain an audio component; wherein one recognition sound-segment in said ordering is designated as a current-location in the ordering;

in response to navigation action by said user that changes the current-location in said ordering, automatically simultaneously playing back at a same time, a plurality of recognition-segments including the recognition-segment at the current-location and one or more recognition-segments that are associated with compositions that are adjacent to the current-location in said ordering;

responsive to detection by the apparatus of a user control action, taking action to arrange or organize the composition that is related to the recognition-segment at the current-location.

Each of the above embodiments may be further enhanced by the addition of one or more of the following elements or features, either individually or in various combinations together:

wherein the composition is music.

wherein the composition is a music video.

wherein the user can navigate through the ordering using forward and/or back control actions, without the user needing to view the ordering on an active visual display.

wherein the ordering was automatically generated, for the user based on a user-request.

wherein the ordering was automatically generated for the user based on a verbal user-request, and the recognition sound-segments are ordered by their probability of satisfying the verbal request made by the user; wherein the verbal request was for a composition title and/or artist.

wherein the ordering was automatically generated, for the user, based on the operating mode or context of the user-device.

wherein the ordering of recognition sound-segments corresponds to the playback order of a sequence or stream of compositions; wherein the playback order was customized for the user.

wherein the ordering of recognition sound-segments corresponds to the playback order of a playlist.

wherein the recognition sound-segments are associated to their related compositions by pointers, links, hyperlinks, universal resource locators and/or universal object identifiers.

wherein the recognition sound-segments are associated to their related compositions by a standardized file-naming convention, tables, databases and/or linked-lists.

wherein at least some of said recognition sound-segments have been chosen to minimize the recognition time of the user or users who have previously experienced the related composition.

wherein at least one of the recognition sound-segments was configured at least partially based upon a test of the recognition time of the user or users who have previously experienced the related composition.

wherein at least one of the recognition sound-segments has been previously test against a user or users, in-order to verify that the recognition sound-segment is substantially immediately recognized by the user or users who have previously experienced the related composition.

wherein a substantially immediately recognizable part of one of said compositions is incorporated at the beginning of one said related recognition sound-segment.

wherein a recognition-segment was chosen from a plurality of alternative sound-segments that were created for a given composition; based on how quickly users were able to recognized each one of the alternative sound segments for the given composition.

wherein a recognition sound-segment for a given composition was previously determined to be recognized the soonest among a plurality of alternative sound-segments, that had been created for the given composition and tested then for their recognition times.

wherein a recognition sound-segment was previously tested to verify that a user or users would recognize the composition, if the recognition sound-segment has played for a fraction of a second.

wherein a least one recognition sound-segment was previously tested to verify that a user or users would recognize the composition, if the recognition sound-segment has played for 1 second or less.

wherein a least one recognition sound-segment was previously tested to verify that a user or users would recognize the composition, if the recognition sound-segment has played for 2 seconds or less.

wherein a least one recognition sound-segment was previously tested to verify that a user or users would recognize the composition, if the recognition sound-segment has played for 3 seconds or less.

wherein a least one recognition sound-segment was previously tested to verify that a user or users would recognize the composition, if the recognition sound-segment has played for 5 seconds or less.

further comprising showing on an active display:
 a representation of the ordering; and
 an indication of the currently active recognition sound-segment within the representation of the ordering.

wherein at least one of said recognition sound-segments includes a mix or addition of a plurality of sound segments; wherein at least one of the mixed or added segments contains a substantially immediately recognizable portion of the related composition.

wherein some of said recognition sound-segments include an audio description of characteristics of the related composition; wherein said characteristics include the artist name or composition title.

further comprising: playing a defined sound that indicates that a recognition sound-segment will begin playing.

wherein a said sound-segment includes a subset of said associated composition or a highly recognizable portion of said associated composition.

wherein said navigating includes playing a said sound-segment in response to a user request or user navigation control action; or automatically playing another sound-segment when the prior sound-segment has finished.

wherein said navigating includes user control actions to move backward or forward in said ordering of associated sound-segments.

wherein said currently active sound-segment includes the currently playing sound-segment or the most recently played sound-segment.

wherein said acting-upon includes playing an associated composition; or adding/deleting an associated composition to/from a playlist or stream of compositions.

wherein said ordering of associated sound-segments is ordered based on a user request; or a user-device context; or estimated satisfaction of a user's request.

wherein a said sound-segment contains a plurality of segments from the associated composition.

wherein a said sound-segment includes a mix of a plurality of sound segments.

wherein the duration of a said sound-segment is from a fraction of a second to multiple seconds long.

wherein a said sound-segment is selected using artists, creators, experts or focus groups.

wherein said compositions include recorded music and music videos.

further comprising: providing one or more recognition sound-segments that are related to a said composition.

wherein a said recognition sound-segment contains a plurality of segments from the related composition.

further comprising: acting-upon the composition that is related to the most recently played recognition sound-segment, when user action has not occurred before the complete said recognition sound-segment has finished playing.

wherein at least some of said recognition sound-segment were substantially immediately recognized when tested with a group of users.

wherein said navigating includes playing a recognition sound-segment in response to a user request or user navigation control action, or automatically playing another recognition sound-segment when the prior recognition sound-segment has finished.

Each of the above embodiments may be further enhanced by the addition of one or more of the following elements or features, either individually or in various combinations together:

wherein the user can navigate through the ordering using forward and/or back control actions, without the user needing to view the ordering on an active visual display.

wherein at least one of the recognition sound-segments has been previously test against a user or users, in-order to verify that the recognition sound-segment is substantially immediately recognized by the user or users who have previously experienced the related composition.

wherein a recognition-segment was chosen from a plurality of alternative sound-segments that were created for a given composition; based on how quickly users were able to recognize each one of the alternative sound segments for the given composition.

Another embodiment may be described by the following:

An apparatus-implemented method to help a user to arrange or organize compositions that contain an audio component, the method comprising:
 utilizing or providing, at a user-device, an ordering of sound-segments and compositions; wherein at least three different sound-segments are related to each composition, wherein the three sound segments include:
  a first sound-segment that comprises a beginning portion of the composition,
  a second sound-segment that is a recognition sound-segment; wherein a recognition sound-segment comprises a portion of the composition that will be substantially immediately recognized by the user who has previously experienced the related composition; and
  a third sound-segment that comprises an ending portion of the composition;
 playing a plurality of said sound-segments including at least one recognition sound-segment, while the user is navigating said ordering of sound-segments; and
 responding to action by the user; to arrange or organize the composition that is related to a sound-segment which is at a current-location in said ordering.

Each of the above embodiments may be further enhanced by the addition of one or more of the following elements or features, either individually or in various combinations together:

wherein a recognition-segment at the current-location is configured to play back louder than any of the recognition-segments that are adjacent to the current location.

wherein playback loudness of recognition-segments that are adjacent to the current-location, decreases with increasing distance from the current-location.

wherein a recognition-segment at the current-location is played back in a different channel and/or at a different volume than recognition-segments that are at adjacent locations.

wherein the recognition-segments for composition or compositions that are adjacent to the current-location are played back at a lower volume and/or in different sound channels.

Additional Applications:

Many other uses for associated recognition-segments may be employed within the scope of the disclosed concepts and embodiments.

As shown in the embodiments, the user may quickly find and act-upon a specific composition without viewing a display or scrolling though window(s) of visual information. It is particularly suitable where user visual distractions may be dangerous/undesirable such as when driving an automobile or where the user does not want to view a visual display (e.g., listening to compositions in a darkened room).

In order to more clearly illustrate functionality, portions of the preceding discussion were oriented toward a user-device with a manually controlled interface; however more generally, any type of user interface including voice controlled and body-motion controlled may be used.

Although the disclosed concepts and embodiments may be particularly suitable for use with music compositions (i.e., songs), the disclosed concepts and embodiments may be more generally useful with any type of media or multi-media composition that includes an audio component. This includes music, music videos, audio versions of books, talks, speeches, voice content, lectures, short films, movies, video programs, television programs, etc.

Not Limited to Detailed Illustrations:

To satisfy the requirements for enablement, this disclosure may contain one or more embodiments which illustrate a particular detailed implementation and use. A detailed illustration often requires choosing only one of a plurality of equivalent detail approaches to show. When terms such as "shall", "should", "is", "are" appear, they should only be interpreted as limitations/requirements for the purpose of maintaining compatibility/consistency between the elements/parameters of the particular detailed illustration. Such terms should not be interpreted as limitations or requirements on the scope of the general concepts as disclosed in their entirety.

For example, if element "A", in a detailed embodiment, is shown as having a certain detailed configuration, then mating element "B" in that detailed example may need to have corresponding limitations in-order to be compatible/interoperable with the detailed element "A". Such limitations on element "B" for compatibility within a detailed illustration do not define limitations on element "B" within all the possible embodiments that fall within the scope of the claims. If another embodiment had been chosen for illustration purposes, element "A" may have a very different detailed configuration and the requirements on element "B" for compatible/interoperable with the element "A" may be very different.

In general, the detailed implementations for the elements in the illustrated embodiments may have many alternate implementations that accomplish the same functional result/objective and are within the scope of the claims.

What is claimed is:

1. Apparatus to help a user organize a playlist or a sequence compositions or a stream of compositions, comprising:
   electronic-display(s) that:
      display an ordering of compositions that contain sound component(s); wherein one or more sound-segments are associated with each composition in said ordering; wherein at least one recognition sound-segment is associated with each composition in said ordering; wherein each said recognition sound-segment includes a portion of its associated composition that is more recognizable to users than a beginning part of its associated composition;
      display an indicator of a current-location that refers to one of said sound-segments in said ordering; and
   electronic-circuitry and/or processor(s) that:
      in response to navigation action(s) by said user, move said indicator to a new current-location on said electronic-display(s), and play the sound-segment at the new current-location; and
      in response to a command-action by said user, act-upon the composition that is associated with the sound-segment at the new current-location, by doing at least one of: play, add, move, remove, cut, copy, paste, drag, arrange, organize, and re-order.

2. The apparatus of claim 1 wherein initially said ordering is automatically generated, for said user based on a user-request.

3. The apparatus of claim 1 wherein initially said ordering is automatically generated for said user based on a user-request, and said compositions are ordered by their probability of satisfying said user-request.

4. The apparatus of claim 1 wherein a composition from a library of compositions and its associated sound-segment(s) is: added, dragged, moved, copied, or pasted into a user desired location in said ordering, in response to user command-action(s).

5. The apparatus of claim 1 wherein for a plurality of compositions in said ordering, an indicator of composition-length is also associated with each composition; and wherein said indicators of composition-length are also displayed on said electronic-display(s).

6. The apparatus of claim 1 wherein for a plurality of compositions in said ordering, a beginning sound-segment is also associated with each composition; and wherein said beginning sound-segments are also displayed on said electronic-display(s).

7. The apparatus of claim 1 wherein for a plurality of compositions in said ordering, an ending sound-segment is also associated with each composition; and wherein said ending sound-segments are also displayed on said electronic-display(s).

8. The apparatus of claim 1 wherein for a plurality of compositions in said ordering, a beginning sound-segment and an ending sound-segment are also associated with each composition; and wherein said beginning sound-segments and said ending sound-segments are also displayed on said electronic-display(s).

9. The apparatus of claim 1 wherein for a plurality of compositions in said ordering, a beginning sound-segment is also associated with each composition; and wherein each said beginning sound-segment is displayed, on said electronic-display(s), relative to an indicator of composition-length of its associated composition.

10. The apparatus of claim 1 wherein for a plurality of compositions in said ordering, an ending sound-segment is also associated with each composition; and wherein each said ending sound-segments is also displayed, on said electronic-display(s), relative to an indicator of composition-length of its associated composition.

11. The apparatus of claim 1 wherein for a plurality of compositions in said ordering, a beginning sound-segment and an ending sound-segment are also associated with each composition; and wherein each said beginning sound-segment and each said ending sound-segment is also displayed on said electronic-display(s), relative to an indicator of composition-length of its associated composition.

12. The apparatus of claim 1 wherein said sound-segments are related to their associated compositions by pointers, links, hyperlinks, universal resource locators and/or universal object identifiers.

13. The apparatus of claim 1 wherein said sound-segments are related to their associated compositions by a standardized file-naming convention, tables, databases and/or linked-lists.

14. The apparatus of claim 1 wherein at least one of said recognition sound-segments is configured at least partially based upon a test of a recognition time of people who have previously experienced its associated composition.

15. The apparatus of claim 1 wherein at least one of said recognition sound-segments is chosen from a plurality of alternative sound-segments that were created for a given composition, based on how quickly a group of users were able to recognize each one of the alternative sound-segments for the given composition.

16. The apparatus of claim 1 wherein at least one of said recognition sound-segments was previously determined to be recognized sooner than one or more alternative sound-segments, that had been created for its associated composition and tested for recognition times of people who have previously experienced its associated composition.

17. The apparatus of claim 1 wherein at least one of said sound-segments includes a mix or addition of a plurality of different sound-segments; and wherein at least one of the mixed or added segments, includes a portion of its associated composition, which is more recognizable to a group of users than a beginning part of its associated composition.

18. The apparatus of claim 1 wherein at least one of said sound-segments includes an audio description of characteristics of its associated composition; and wherein said characteristics include an artist name or composition title.

19. The apparatus of claim 1 wherein said ordering is navigated in one or more of: an up-down direction and in a left-right direction.

20. The apparatus of claim 1 wherein for a plurality of compositions in said ordering, a beginning sound-segment and an ending sound-segment are also associated with each composition; wherein said beginning sound-segments and said ending sound-segments are also displayed on said electronic-display(s); and wherein a location of one or more of said beginning sound-segment or said ending sound-segment is adjustable by said user.

21. The apparatus of claim 1 wherein a length of one or more of said sound-segment(s) is adjustable by said user.

22. The apparatus of claim 1 wherein an overlapping playback of an ending portion of one composition and a starting portion of a following composition in said ordering is adjustable by said user.

23. A method to help a user organize a playlist or a sequence compositions or a stream of compositions, comprising:
displaying, on electronic-display(s), an ordering of compositions that contain sound component(s); wherein one or more sound-segments are associated with each composition in said ordering; wherein at least one recognition sound-segment is associated with each composition in said ordering; wherein each said recognition sound-segment includes a portion of its associated composition that is more recognizable to users than a beginning part of its associated composition;
displaying, on said electronic-display(s), an indicator of a current-location in said ordering that refers to one of said sound-segments in said ordering;
in response to navigation action(s) by said user, moving said indicator to a sound-segment at a new current-location on said electronic-display(s), and playing, by electronic-circuitry and/or processor(s), the sound-segment that is associated with the new current-location in said ordering; and
in response to a command-action by said user, act-upon by said electronic-circuitry and/or processor(s), the composition that is associated with the sound-segment at the new current-location by doing, at least one of: play, add, move, remove, cut, copy, paste, drag, arrange, organize, and re-order.

24. One or more computer-readable memories or storage media, not including carrier-waves, having computer-readable instructions thereon which, when executed by electronic-circuitry and/or processor(s), implement a method to help a user organize a playlist or a sequence compositions or a stream of compositions, said method comprising:
displaying, on electronic-display(s), an ordering of compositions that contain sound component(s); wherein one or more sound-segments are associated with each composition in said ordering; wherein at least one recognition sound-segment is associated with each composition in said ordering; wherein each said recognition sound-segment includes a portion of its associated composition that is more recognizable to users than a beginning part of its associated composition;
displaying, on said electronic-display(s), an indicator of a current-location in said ordering that refers to one of said sound-segments in said ordering;
in response to navigation action(s) by said user, moving said indicator to a sound-segment at a new current-location on said electronic-display(s), and playing, by electronic-circuitry and/or processor(s), the sound-segment that is associated with the new current-location in said ordering; and
in response to a command-action by said user, act-upon by said electronic-circuitry and/or processor(s), the composition that is associated with the sound-segment at the new current-location by doing, at least one of: play, add, move, remove, cut, copy, paste, drag, arrange, organize, and re-order.

* * * * *